US012711781B2

(12) United States Patent
Zhou et al.

(10) Patent No.: US 12,711,781 B2
(45) Date of Patent: Aug. 18, 2026

(54) IDENTIFYING BIDIRECTIONAL CHANNELIZATION ZONES AND LANE DIRECTIONALITY

(71) Applicant: GM Cruise Holdings LLC, San Francisco, CA (US)

(72) Inventors: Changkai Zhou, Mountain View, CA (US); Shuqin Xie, Sunnyvale, CA (US); Eric Lujan, San Francisco, CA (US); Zachary Wright Garcia, San Francisco, CA (US); Evan Paul, San Francisco, CA (US); Nestor Grace, San Francisco, CA (US); Kevin Yuwen Tong, Carlsbad, CA (US); Raghid Mardini, Oakland, CA (US); Sasanka Nagavalli, Cupertino, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 562 days.

(21) Appl. No.: 18/174,428

(22) Filed: Feb. 24, 2023

(65) Prior Publication Data

US 2024/0290109 A1 Aug. 29, 2024

(51) Int. Cl.
*G06V 20/58* (2022.01)
*B60W 60/00* (2020.01)

(52) U.S. Cl.
CPC ......... *G06V 20/582* (2022.01); *B60W 60/001* (2020.02); *B60W 2420/408* (2024.01); *B60W 2554/4045* (2020.02); *B60W 2554/4049* (2020.02)

(58) Field of Classification Search
None
See application file for complete search history.

(56) References Cited

U.S. PATENT DOCUMENTS 9,193,355 B2 * 11/2015 Ferguson .............. B60W 40/06
10,048,691 B2 * 8/2018 Reiff ..................... B60W 30/12
(Continued)

OTHER PUBLICATIONS

Nienhuser, D., Gumpp, T., Zollner, J.M. and Dillmann, R., Jun. 2008. Recognition and attribution of variable message signs and lanes. In 2008 IEEE Intelligent Vehicles Symposium (pp. 55-60). IEEE. (Year: 2008).*

*Primary Examiner* — Michelle M Entezari Hausmann
(74) *Attorney, Agent, or Firm* — CANTOR COLBURN LLP

(57) ABSTRACT

Systems and techniques are provided for determining a directionality of temporary traffic lanes. An example method can include detecting, based on sensor data from sensors of a vehicle, a temporary traffic lane on a road configured for use by traffic to navigate the road in lieu of a pre-existing traffic lane on the road, wherein a boundary of the temporary traffic lane is defined by objects on the road; detecting, based on the sensor data, cues indicating a directionality of the temporary traffic lane based on a first indication of a direction of travel of a vehicle traveling through the temporary traffic lane or an adjacent temporary traffic lane, a second indication of directionality provided by a human traffic controller in the road, and/or a third indication of directionality predicted based on objects on the road; and detecting the directionality of the temporary traffic lane based on the cues.

18 Claims, 7 Drawing Sheets

(56) References Cited

U.S. PATENT DOCUMENTS

| | | | | |
|---|---|---|---|---|
| 2011/0098922 | A1* | 4/2011 | Ibrahim | B60W 40/08<br>701/532 |
| 2013/0274959 | A1* | 10/2013 | Igarashi | B60W 30/12<br>701/1 |
| 2017/0160744 | A1* | 6/2017 | Chia | G05D 1/0212 |
| 2019/0019413 | A1* | 1/2019 | Yun | B60W 60/0053 |
| 2020/0386572 | A1* | 12/2020 | Kubertschak | G06V 20/582 |
| 2022/0066456 | A1* | 3/2022 | Ebrahimi Afrouzi | G06F 3/04883 |
| 2022/0092987 | A1* | 3/2022 | Oboril | B60W 30/0956 |
| 2022/0135039 | A1* | 5/2022 | Jardine | B60W 30/18163<br>701/26 |
| 2022/0242442 | A1* | 8/2022 | Mcneely | B60W 50/14 |
| 2022/0332349 | A1* | 10/2022 | Benou | G06T 7/50 |
| 2022/0392229 | A1* | 12/2022 | Dharia | G06V 10/98 |
| 2023/0140569 | A1* | 5/2023 | Foster | B60W 60/0017<br>701/400 |
| 2023/0196907 | A1* | 6/2023 | Sunderrajan | G08G 1/012<br>701/423 |
| 2025/0368227 | A1* | 12/2025 | Hendler | B60W 60/0015 |

* cited by examiner

600

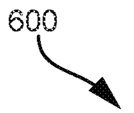

DETECT, BASED ON SENSOR DATA FROM ONE OR MORE SENSORS OF A VEHICLE, A TEMPORARY TRAFFIC LANE ON A ROAD CONFIGURED FOR USE BY TRAFFIC TO NAVIGATE THE ROAD IN LIEU OF ONE OR MORE PRE-EXISTING TRAFFIC LANES ON THE ROAD
602

DETECT, BASED ON THE SENSOR DATA, ONE OR MORE CUES INDICATING A DIRECTIONALITY OF THE TEMPORARY TRAFFIC LANE BASED ON A FIRST INDICATION OF A DIRECTION OF TRAVEL OF A VEHICLE TRAVELING THROUGH THE TEMPORARY TRAFFIC LANE OR AN ADJACENT TEMPORARY TRAFFIC LANE, A SECOND INDICATION OF DIRECTIONALITY PROVIDED BY A HUMAN TRAFFIC CONTROLLER IN A SCENE ASSOCIATED WITH THE ROAD, AND/OR A THIRD INDICATION OF DIRECTIONALITY PREDICTED BASED ON ONE OR MORE OBJECTS ON THE ROAD
604

DETECT THE DIRECTIONALITY OF THE TEMPORARY TRAFFIC LANE BASED ON THE ONE OR MORE CUES
606

FIG. 6

IDENTIFYING BIDIRECTIONAL CHANNELIZATION ZONES AND LANE DIRECTIONALITY

TECHNICAL FIELD

The present disclosure generally relates to detecting and/or understanding temporary traffic lanes by autonomous vehicles. For example, aspects of the present disclosure relate to systems and techniques for enabling autonomous vehicles to identify bidirectional channelization zones and/or understand lane directionalities and/or traffic flows through temporary traffic lanes.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative examples and aspects of the present application are described in detail below with reference to the following figures:

FIG. 6 is a flowchart illustrating an example process for determining a directionality of temporary traffic lanes, in accordance with some examples of the present disclosure.

DETAILED DESCRIPTION

Figure 1:
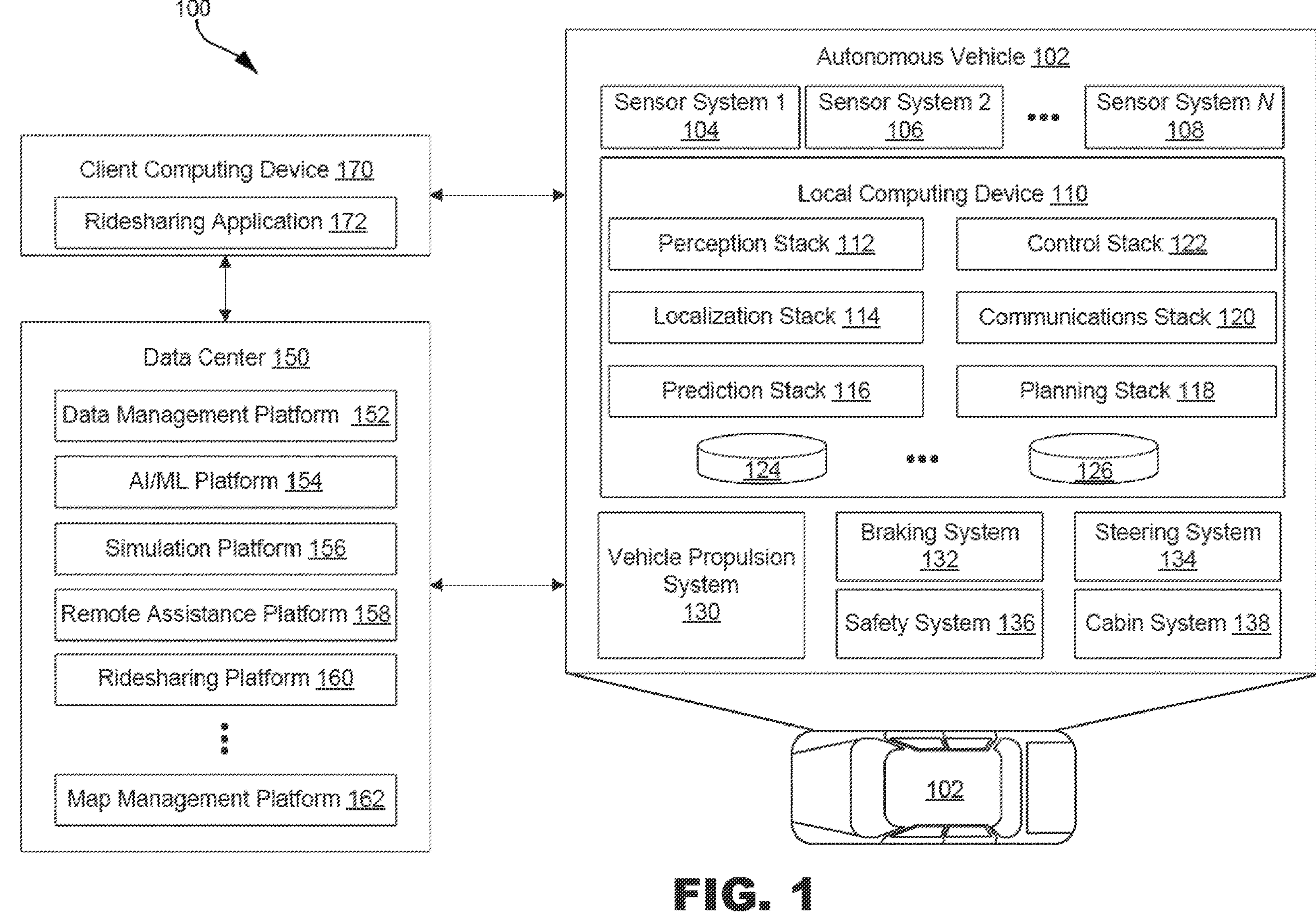
FIG. 1 is a diagram illustrating an example system environment that can be used to facilitate autonomous vehicle (AV) navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides aspects and examples of the disclosure, and is not intended to limit the scope, applicability, or configuration of the disclosure. Rather, the ensuing description of the aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, an inertial measurement unit (IMU), and/or an acoustic sensor (e.g., sound navigation and ranging (SONAR), microphone, etc.), global navigation satellite system (GNSS) and/or global positioning system (GPS) receiver, amongst others. The AVs can use the various sensors to collect data and measurements that the AVs can use for AV operations such as perception (e.g., object detection, event detection, tracking, localization, sensor fusion, point cloud processing, image processing, etc.), planning (e.g., route planning, trajectory planning, situation analysis, behavioral and/or action planning, mission planning, etc.), control (e.g., steering, braking, throttling, lateral control, longitudinal control, model predictive control (MPC), proportional-derivative-integral, etc.), prediction (e.g., motion prediction, behavior prediction, etc.), etc. The sensors can provide the data and measurements to an internal computing system of the autonomous vehicle, which can use the data and measurements to control a mechanical system of the autonomous vehicle, such as a vehicle propulsion system, a braking system, and/or a steering system, for example.

In some cases, an autonomous vehicle may have difficulty autonomously navigating in scenarios where the autonomous vehicle needs to deviate from a predetermined route in an environment in order to accommodate certain conditions and/or events. For example, the lanes used by vehicles on the road and/or the flow of traffic through lanes on the road can be modified to accommodate certain conditions and/or events such as, for example and without limitation, construction zones, events (e.g., concerts, sporting events, festivals, protests, block parties, etc.), accidents, road closures, hazards, road obstacles, and/or other conditions and/or events. Autonomous vehicles may have difficulty understanding the scene with the modified lane which consequently can create various challenges for the autonomous vehicle if the autonomous vehicle needs to navigate the environment.

In some cases, temporary traffic lanes can be created to redirect vehicles through the temporary traffic lanes as needed. For example, a road can include a construction zone where construction workers in the construction zone may use certain objects (e.g., cones, barricades, flares, barriers, signs, vehicles, and/or any other objects) to create a temporary traffic lane(s) used to direct traffic within, around, and/or through the construction zone for a period of time. The autonomous vehicle may need to detect and understand such temporary traffic lane(s) in order to properly navigate through the temporary traffic lane(s). To illustrate, construction workers in a construction zone on a road may use cones and/or barricades to create a temporary traffic lane(s) that avoids the construction zone (and/or an area thereof) by directing traffic through that temporary traffic lane(s). To navigate around and/or through the construction zone, the autonomous vehicle may need to detect the temporary traffic lane(s) created using objects and understand the expected flow of traffic (e.g., the lane direction(s) and/or channelization, etc.) in order to properly traverse the temporary traffic lane(s) as expected to avoid the construction zone and/or an area thereof.

Typically, the temporary traffic lane(s) may not be included and/or identified in a map of the environment used by an autonomous vehicle to navigate, such as a semantic map of the environment, and/or may not be included or identified in other data used by the autonomous vehicle to navigate, such as a traffic route, traffic information, an operational map, semantic information, and/or any other data used by the autonomous vehicle to navigate through the environment. Thus, the autonomous vehicle may not be able to detect and understand the temporary traffic lane(s) simply by reviewing an existing map of the environment and/or other data used by the autonomous vehicle to navigate. Accordingly, if the autonomous vehicle is otherwise unable to detect and understand the temporary traffic lane(s) when encountering the temporary traffic lane(s), the computer system of the autonomous vehicle may need to reroute the autonomous vehicle, which can increase the length and/or time of the trip (and thus the experience of any passengers of the autonomous vehicle and/or any users waiting for the autonomous vehicle). Alternatively, the autonomous vehicle may need to be manually guided by a passenger of the autonomous vehicle or a remote agent who is able to remotely guide the autonomous vehicle or take control of the autonomous vehicle.

In some cases, the traffic rules that vehicles are expected to apply when navigating through a temporary traffic lane may differ from the traffic rules required in regular traffic lanes. Moreover, the traffic flow or channelization through temporary traffic lanes (e.g., the direction of traffic flow through the temporary traffic lanes) may differ from the traffic flow through the same region when the regular traffic lanes are used (e.g., in the absence of the temporary traffic lanes), and the configuration of the temporary traffic lane may differ from that of the regular traffic lane that exists in the region and is used by traffic in the absence of the temporary traffic lane. However, an autonomous vehicle may not understand the traffic rules that apply to the temporary traffic lanes and/or the traffic flow or channelization through the temporary traffic lanes. For example, the data used by the autonomous vehicle to navigate the environment associated with the temporary traffic lanes, such as a semantic map and/or an operational map, may not identify the temporary traffic lanes, the associated traffic rules, and/or the associated traffic flow or channelization. In many cases, it can be difficult for the autonomous vehicle to detect such temporary traffic lanes, the relevant traffic rules for the temporary traffic lanes, and/or the traffic flow or channelization based on sensor data collected by the autonomous vehicle.

Systems, apparatuses, processes (also referred to as methods), and computer-readable media (collectively referred to as "systems and techniques") are described herein for enabling autonomous vehicles to detect and/or understand temporary traffic lanes. For example, the systems and techniques can be used by autonomous vehicles to identify bidirectional channelization zones (e.g., temporary traffic lanes for multiple directions of traffic) and/or understand the directionality of the temporary traffic lanes (e.g., the direction of traffic of each temporary traffic lane). By learning to detect and understand temporary traffic lanes (e.g., understand the direction of traffic in each temporary traffic lane, understand the rules for traversing the temporary traffic lanes, understand the boundaries of each temporary traffic lane used by the autonomous vehicles, understand the proper behavior of the autonomous vehicles and other vehicles when traversing temporary traffic lanes, etc.), the systems and techniques described herein can ensure that autonomous vehicles identify the boundaries of temporary traffic lanes and how to properly navigate through the temporary traffic lanes.

Moreover, learning to detect the boundaries and configuration of temporary traffic lanes and understand the directionality and rules of the temporary traffic lanes can help an autonomous vehicle ensure that it does not drive on closed or blocked roads. Detecting and understanding the direction of traffic through each temporary traffic lane as described herein can also allow an autonomous vehicle to safely merge into the correct lane within multiple temporary traffic lanes, avoid potential collisions with other vehicles and/or road users, and can help the autonomous vehicle make decisions on when to change lanes and when to yield to other vehicles.

In some examples, an autonomous vehicle implementing the systems and techniques described herein can use sensor data collected in an environment to detect and understand temporary traffic lanes created in the environment using objects such as cones, flares, barricades, vehicles, barriers, and/or any other objects. For example, the autonomous vehicle may use LIDAR data, RADAR data, infrared data, acoustic data, and/or camera data to detect objects used to create temporary traffic lanes. The autonomous vehicle can use such data to detect the presence and configuration of the temporary traffic lanes created using the objects.

In some aspects, the autonomous vehicle may use the data to detect one or more cues in the environment and use the cues to understand the applicable traffic rules for traversing the temporary traffic lanes and/or the directionality (e.g., channelization/flow) of the temporary traffic lanes. For example, the autonomous vehicle can use sensor data to determine a semantic meaning of detected objects used to create temporary traffic lanes in an environment. After detecting the temporary traffic lanes based on the determination of the semantic meaning of the detected objects, the autonomous vehicle may use the sensor data to detect any signs used in the temporary traffic lanes to route traffic through the temporary traffic lanes and/or indicate the directionality of the temporary traffic lanes, detect the direction of other vehicles traveling through the temporary traffic lanes, the positioning and/or angle of one or more of the objects used to create the temporary traffic lanes, the presence and/or position of certain vehicles in the scene (e.g., emergency vehicles, traffic control vehicles, construction vehicles, etc.), and/or a traffic directive signal from a human traffic controller directing traffic through the temporary traffic lanes. The autonomous vehicle can determine the applicable traffic rules for the temporary traffic lanes and the directionality (e.g., channelization/flow) of the temporary traffic lanes based on any detected signs, the direction of any detected vehicles traversing the temporary traffic lanes, the positioning and/or angle of one or more of the objects used to create the temporary traffic lanes, the presence and/or position of certain vehicles in the scene, and/or any traffic directive signals from a human traffic controller.

The autonomous vehicle can additionally or alternatively use other cues to determine the applicable traffic rules for the temporary traffic lanes and the directionality (e.g., channelization/flow) of the temporary traffic lanes. For example, in some cases, the autonomous vehicle can additionally use the number of traffic lanes (e.g., existing traffic lanes and/or temporary traffic lanes) in the scene. To illustrate, if the autonomous vehicle determines that the scene includes two traffic lanes used in the absence of the temporary traffic lanes and/or that the temporary traffic lanes include two temporary traffic lanes, the autonomous vehicle may infer that the temporary traffic lanes likely include lanes in two directions. On the other hand, if the scene only includes one traffic lane (e.g., one existing traffic lane (e.g., a one-way road) and/or one temporary traffic lane), the autonomous vehicle may infer that traffic through the traffic lane may only flow in one direction, and if the scene includes more than two traffic lanes (e.g., more than two existing traffic lanes and/or temporary traffic lanes), the autonomous vehicle may infer that the temporary traffic lanes likely include multiple traffic lanes for each direction or at least one direction.

The autonomous vehicle may consider a single cue or multiple cues when determining the applicable traffic rules for the temporary traffic lanes and the directionality (e.g., channelization/flow) of the temporary traffic lanes. In some examples, the autonomous vehicle may apply respective weights of confidence to difference cues or types of cues, and may use the respective weights of any detected cues to determine the applicable traffic rules for the temporary traffic lanes and the directionality (e.g., channelization/flow) of the temporary traffic lanes. For example, the autonomous vehicle may apply higher weights to certain cues (e.g., thus increasing their impact on the final decision/decisions made by the autonomous vehicle) that are more instructive, authoritative, and/or relevant; and lower weights to other cues (e.g., thus decreasing their impact on the final decision/decisions made by the autonomous vehicle) that are less instructive, authoritative, and/or relevant.

To illustrate, in one example, the autonomous vehicle may assign higher weights (or treat as dispositive) to any temporary signs detected that are used to route traffic through the temporary traffic lanes and/or indicate the directionality of the temporary traffic lanes, to any detected indication of a direction traveled by other vehicles traversing the temporary traffic lanes, and/or a traffic directive signal from a human traffic controller directing traffic through the temporary traffic lanes. On the other hand, in this example, the autonomous vehicle may assign lower weights (and/or treat each of the follow cues as insufficient) to the detected positioning and/or angle of one or more of the objects used to create the temporary traffic lanes, any detected presence and/or position of certain vehicles in the scene, and/or a number of existing traffic lanes in the scene and/or temporary traffic lanes in the scene.

As used herein, a temporary traffic lane refers to a traffic lane created by placing certain objects and/or markings that define and/or indicate a path for traffic and/or create a path for traffic, where the path for traffic differs from the path for traffic associated with an existing and/or permanent traffic lane in the scene (e.g., in the road or street, etc.) and/or that differs from a path for traffic associated with a traffic lane defined in a map of the scene (e.g., a navigation map, an operational map, a semantic map, etc.) used by vehicles to navigate the scene and/or understand the scene. For example, a temporary traffic lane can include a traffic lane created using objects (e.g., traffic cones, flares, barricades, a vehicle(s), a sign(s), medians or dividers, and/or any other objects) placed on a road to create a path for traffic having boundaries defined and/or represented by the objects. A temporary traffic lane can also refer to a traffic lane that is temporarily created by placing objects in an area of a scene that does not already have a preexisting or predefined traffic lane.

Examples of the systems and techniques described herein for processing data are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can include multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs (e.g., AV 102), Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application (e.g., ridesharing application 172) to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can, in some instances, include one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

In some aspects, the systems and techniques described herein can enable autonomous vehicles to detect and/or understand temporary traffic lanes and the directionality (e.g., the direction of traffic) of each temporary traffic lane. For example, the systems and techniques can be used by autonomous vehicles to identify bidirectional channelization zones (e.g., temporary traffic lanes for multiple directions of traffic) and/or understand the directionality of the temporary traffic lanes (e.g., the direction of traffic of each temporary traffic lane). The systems and techniques described herein can detect and understand temporary traffic lanes of any configuration and understand the traffic rules and direction of traffic associated with each temporary traffic lane regardless of the configuration of the temporary traffic lanes, as further described herein.

Figure 2:
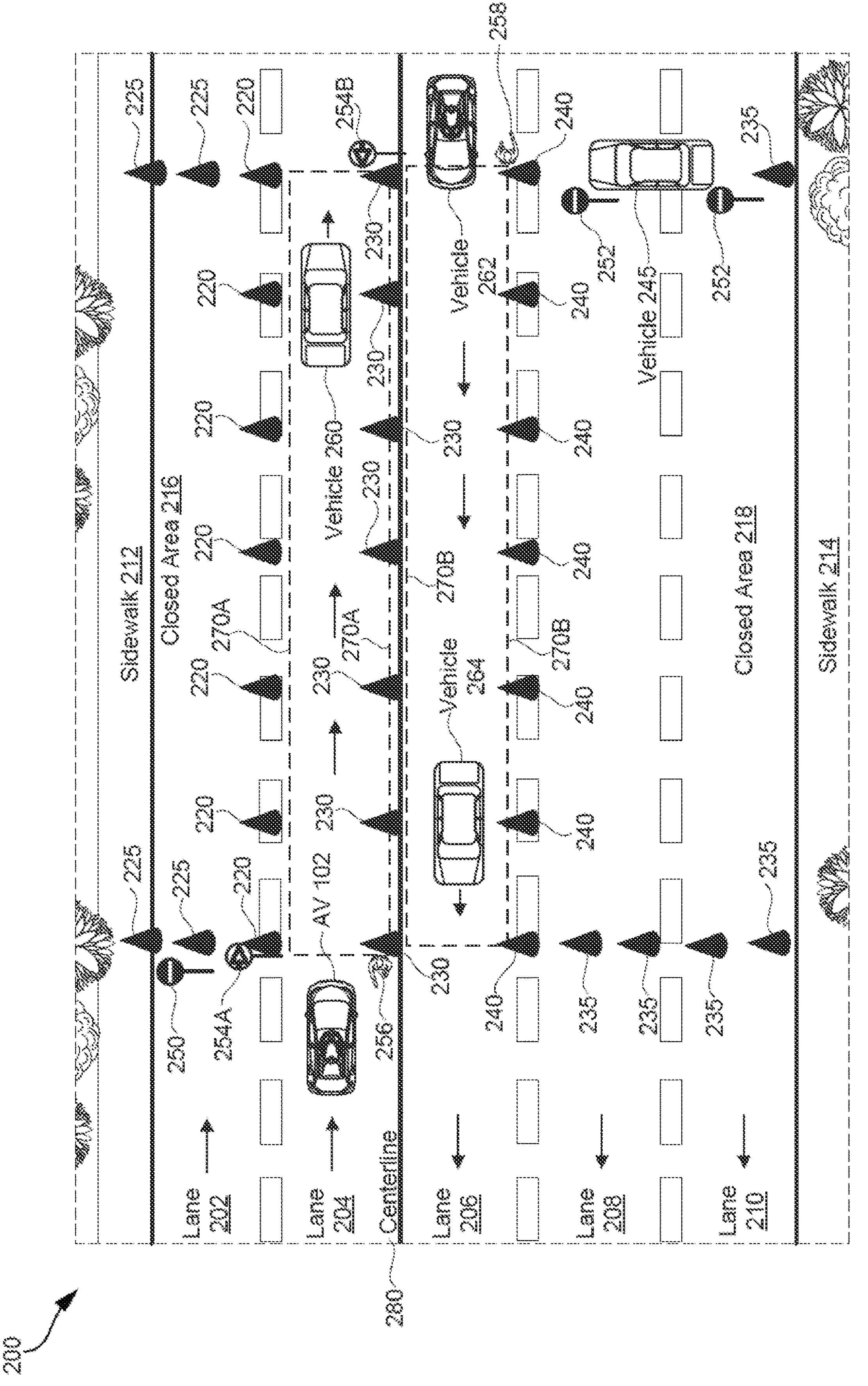
FIGS. 2 through 5 are diagrams illustrating example configurations of temporary traffic lanes in example scenes, in accordance with some examples of the present disclosure.

FIG. 2 is a diagram illustrating an example configuration of temporary traffic lanes in a scene 200. The temporary traffic lanes can include traffic lanes temporarily created on a road using objects and/or markings to reroute or redirect traffic during a particular time period and/or a particular event(s) and/or condition(s) such as, for example and without limitation, road work or construction work, a gathering event (e.g., a festival, a game, a convention, a protest, a political rally, a concert, a march or parade, a block party, etc.), an accident, a road hazard, an infrastructure condition, and/or any other event and/or condition. In some examples, temporary traffic lanes can be created to direct traffic in lieu of pre-existing traffic lanes on a road or in the absence of pre-existing or permanent traffic lanes on the road.

The number, configuration, directionality, and/or attributes of temporary traffic lanes on a road can vary based on a number of factors such as, for example, the number of pre-existing traffic lanes on the road, the size and/or configuration of the road, the type of event and/or condition that prompted the creation of the temporary traffic lanes, the time(s) of day associated with the temporary traffic lanes and/or day(s) of the week or month associated with the temporary traffic lanes, traffic characteristics associated with the road and/or surrounding area(s), the flow of traffic in the road and/or other areas surrounding and/or connected to the road at one or more particular periods of time, the configuration (e.g., geometry, position, etc.) of the road and/or a closed area(s) on the road being avoided via the temporary traffic lanes, the traffic conditions at one or more times such as a time or range of times when the temporary traffic lanes are created and/or set to be removed, predicted traffic conditions at a future time (e.g., relative to a particular time such as a time when the temporary traffic lanes are created and/or authorized), and/or any other factors. The temporary traffic lanes can be created using one or more types of objects such as, for example, traffic cones, flares, barricades, signs, vehicles (e.g., parked vehicles), fences, structures, trees and/or plants, grass, barriers, median strips or blocks, and/or any other objects. One or more of such objects can be used to define and/or represent a boundary of one or more of the temporary traffic lanes. In some examples, one or more existing items on a scene (e.g., on the road and/or on one or more surrounding areas) such as, for example, a curb or sidewalk, a median, a grassy area, a sign, etc.

In the example of FIG. 2, the scene 200 includes traffic lanes 202-210 defined by lane markings on the road. The traffic lanes 202-210 represent the pre-existing traffic lanes on the road used to direct traffic on the road prior to the creation of temporary traffic lanes as further described herein. Thus, the temporary traffic lanes can be used to direct traffic in lieu of the traffic lanes 202-210. The traffic lanes 202-204 are configured for traffic (e.g., to direct traffic) in one direction (e.g., east to west or vice versa, north to south or vice versa, etc.), and the traffic lanes 206-210 are configured for traffic (e.g., to direct traffic) in a different and/or opposite direction relative to the direction associated with the traffic lanes 202-204.

The traffic lanes 202-204 include a closed area 216, and the traffic lanes 206-210 include a closed area 218. In FIG. 2, temporary traffic lanes 270A and 270B have been created to route/direct traffic around the closed areas 216 and 218 and/or to allow vehicles to avoid the closed areas 216 and 218 when navigating the road in the scene 200. While FIG. 2 includes closed areas 216 and 218 and the temporary traffic lanes 270A 270B were created as a result of the closed areas 216 and 218, other examples may include temporary traffic lanes without closed areas. In other words, in other examples, temporary traffic lanes may not be created as a result of any closed areas and/or to route/direct traffic to avoid any closed areas. The closed areas 216 and 218 in FIG. 2 are merely provided as one illustrative example of a scene with temporary traffic lanes used to direct/route traffic.

The closed areas 216 and 218 can be portions of the road that are closed to traffic for any reason such as, for example and without limitation, to create a construction zone for work on the portions of the road and/or one or more surrounding areas such as a portion of the sidewalk 212 and/or a portion of the sidewalk 214, to isolate one or more hazards on the road, to create areas restricted to traffic such as seating areas for restaurants or pedestrian areas for pedestrians during an event, to block areas where certain events are taking place such as accidents or stalled vehicles, to redirect traffic, to create space for certain agents such as emergency agents and/or vehicles (e.g., police officers and/or vehicles, firefighters and/or firetrucks, tow-truck agents and/or tow trucks, emergency medical agents and/or emergency vehicles, etc.), to change a flow of traffic for any reason such as an event and/or condition in an area within a proximity to the closed areas 216 and 218, and/or any other reason.

The closed area 216 in this example has been created (e.g., the area in the closed area 216 has been closed off or blocked off) using objects 225, and the closed area 218 has been created (e.g., the area in the closed area 218 has been closed off or blocked off) using objects 235 and a vehicle 245. The objects 225 and the objects 235 in this example represent traffic cones. However, in other examples, other types of objects can be used to create a closed area (e.g., in addition to or in lieu of traffic cones) such as, for example, flares, barricades, vehicles, signs, and/or any other objects. Moreover, in some examples, the closed area 216 can optionally include one or more signs, such as sign 250, warning road users that the closed area 216 should not be used or traversed by vehicles. Similarly, in some examples, the closed area 218 can optionally include one or more signs, such as signs 252, warning road users that the closed area 218 should not be used or traversed by vehicles. In some examples, the signs 250 and 252 can include "Do not enter" signs. In other examples, the signs 250 and 252 can include any other type of sign that visually warns and/or informs road users about the closed areas 216 and 218.

The objects 225 are used to create boundaries of the closed area 216, and the objects 235 and the vehicle 245 are used to create boundaries of the closed area 218. In some examples, the objects 220 used to define one of the borders/boundaries of the temporary traffic lane 270A can also be used to create one of the boundaries of the closed area 216 (e.g., a boundary shared between the closed area 216 and the temporary traffic lane 270A), and the objects 240 used to define one of the borders/boundaries of the temporary traffic lane 270B can also be used to create one of the boundaries of the closed area 218 (e.g., a boundary shared between the closed area 218 and the temporary traffic lane 270B). The boundaries of a closed area can be defined using objects of a same type such as objects 225 and objects 220 used to define the boundaries of the closed area 216, or using different types of objects such as the vehicle 245 and the objects 235 and 240 used to define the boundaries of the closed area 218.

The objects 225 are used to create a barrier to prevent vehicles from entering the closed area 216 and/or indicate to road users that vehicles should not enter the closed area 216. As previously noted, the barrier also includes some of the objects 220 used to create a temporary traffic lane 270A. In other words, the objects 220 used to define a boundary of the temporary traffic lane 270A can also be used to define a shared boundary of the closed area 216. Moreover, the objects 235 and the vehicle 245 are used to create a barrier to prevent vehicles from entering the closed area 218 and/or indicate to road users that vehicles should not enter the closed area 218. In some cases, the barrier can also include some of the objects 240 used to create a temporary traffic lane 270B. For example, the objects 240 used to define a boundary of the temporary traffic lane 270B can also be used to define a shared boundary of the closed area 218.

To prevent vehicles from driving through the closed areas 216 and 218 and/or direct traffic to avoid the closed areas 216 and 218 (e.g., around the closed areas 216 and 218), two temporary traffic lanes 270A and 270B have been created in the scene 200. The temporary traffic lane 270A is for traffic traveling in one direction (e.g., east to west or vice versa, north to south or vice versa, etc.) and the temporary traffic lane 270B is for traffic traveling in a different or opposite direction relative to the direction of the temporary traffic lane 270A. In some examples, the temporary traffic lane 270A can be used to direct traffic in a same direction as one or more pre-existing traffic lanes overlapping with the temporary traffic lane 270A, such as traffic lane 204, and the temporary traffic lane 270B can be used to direct traffic in a same direction as one or more pre-existing traffic lanes overlapping with the temporary traffic lane 270B, such as traffic lane 206. In other examples, the temporary traffic lane 270A can be used to direct traffic in a different direction as one or more pre-existing traffic lanes overlapping with the temporary traffic lane 270A, such as traffic lane 204, and the temporary traffic lane 270B can be used to direct traffic in a different direction as one or more pre-existing traffic lanes overlapping with the temporary traffic lane 270B, such as traffic lane 206.

In FIG. 2, the temporary traffic lane 270A has been created using the objects 220 and 230, and the temporary traffic lane 270B has been created using the objects 230 and 240. For example, the objects 220 form or define one of the boundaries of the temporary traffic lane 270A, which in this example is a boundary shared between the temporary traffic lane 270A and the closed area 216, and the objects 230 form or define another boundary of the temporary traffic lane 270A, which in this example is a boundary shared between the temporary traffic lane 270A and the temporary traffic lane 270B.

When navigating through a scene, a computer (e.g., local computing device 110) of the AV 102 can use sensor data (e.g., collected using sensor system 104, sensor system 106, and/or sensor system 108) to detect any of the temporary traffic lanes 270A and 270B and a respective directionality of the temporary traffic lanes 270A and 270B (e.g., a direction of traffic through the temporary traffic lanes). In some cases, the computer of the AV 102 can use sensor data to detect one or more additional attributes of any of the temporary traffic lanes 270A and 270B such as, for example, a traffic lane shape, traffic rules applicable to a temporary traffic lane(s), a semantic meaning of the objects used to define the boundaries of the temporary traffic lanes 270A and 270B, and/or any other attributes.

For example, the computer of the AV 102 can use sensor data (e.g., LIDAR data, RADAR data, camera data, infrared (IR) sensor data, acoustic data (e.g., microphone data, ultrasonic sensor data, etc.), inertial measurement unit (IMU) data, GPS/GNSS data, wireless data (e.g., WIFI or cellular data), odometer data, and/or any other type of sensor data) from one or more sensors of the AV 102 to detect the temporary traffic lane 270A by detecting the objects 220 and 230 used to define the boundaries of the temporary traffic lane 270A and determining a semantic meaning of the objects 220 and 230. The computer of the AV 102 can also use the sensor data to determine a directionality of the temporary traffic lane 270A to determine whether the AV 102 should use the temporary traffic lane 270A or the temporary traffic lane 270B to navigate the scene 200 in a desired direction. The computer of the AV 102 can optionally use the sensor data to determine other attributes of the temporary traffic lane 270A such as one or more applicable traffic rules, a geometry of the temporary traffic lane 270A, and/or any other attributes.

The computer of the AV 102 can determine the directionality of the temporary traffic lane 270A (and any other attributes such as an applicable traffic rule and/or a geometry) based on one or more cues detected based on the sensor data (and, optionally, other data such as, for example, map data, Internet data, traffic data, etc.). In some cases, the computer of the AV 102 can use a combination of cues to determine the directionality of temporary traffic lanes on a road. In such cases, the computer of the AV 102 can weight the different cues (e.g., can apply respective weights to the cues and consider the combined cues with the respective weights), and/or can treat some cues as more reliable/informative and other cues as validation cues, as further described below. As further describe below, in some cases, the computer of the AV 102 may treat certain cues as individually sufficient (e.g., dispositive) for determining the directionality of temporary traffic lanes on a road, and other cues as informative cues that cannot be relied on to determine directionality without more cues (e.g., are not individually dispositive).

Non-limiting examples of cues that can be used to determine the directionality of temporary traffic lanes (and other information such as, for example, traffic rules, lane geometries, etc.) can include the direction of other vehicles navigating through the temporary traffic lane 270A and/or the temporary traffic lane 270B such as vehicles 260 through 264, the directionality of one or more pre-existing traffic lanes (e.g., the mapped direction of one or more traffic lanes that were in use prior to the creation and use of the temporary traffic lanes 270A and 270B) such as traffic lanes 202-210, the directionality of one or more pre-existing traffic lanes that overlap with the temporary traffic lane 270A and/or the temporary traffic lane 270B, any signs in the scene 200 (e.g., sign 250, sign 252, sign 254A, sign 254B), the position of other vehicles in the scene 200 (e.g., other vehicles navigating the scene 200, such as any of the vehicles 260 through 264, and/or other vehicles used to create boundaries of any of the temporary traffic lanes 270A-270B and/or any of the closed areas 216-218, such as vehicle 245 used to create a boundary of the closed area 218), information (e.g., directions, signals, gestures, verbal cues, etc.) from one or more human traffic controllers (HTCs) such as HTC 256 and/or HTC 258, the position (e.g., angle, direction, etc.) of objects used to create boundaries of the temporary traffic lane 270A and/or the temporary traffic lane 270B, the number of pre-existing traffic lanes (e.g., traffic lanes 202-210) in the scene 200 and/or the number of temporary traffic lanes in the scene, the position of any temporary traffic lanes relative to a centerline (e.g., centerline 280) on the road, and/or any other cues.

For example, the sign 254A associated with the temporary traffic lane 270A indicates a direction of traffic through the temporary traffic lane 270A. The computer of the AV 102 can detect the sign 254A and recognize the semantic meaning of the sign 254A using the sensor data, as previously described. The computer of the AV 102 can determine the directionality of the temporary traffic lane 270A based on the indication of the direction of traffic through the temporary traffic lane 270A provided by the sign 254A. Similarly, the sign 254B associated with the temporary traffic lane 270B indicates a direction of traffic through the temporary traffic lane 270B. The computer of the AV 102 can detect the sign 254B and recognize the semantic meaning of the sign 254B using the sensor data, and determine the directionality of the temporary traffic lane 270B based on the indication of the direction of traffic through the temporary traffic lane 270B provided by the sign 254B.

In some examples, the sign 254A and/or the sign 254B can represent temporary signs implemented specifically for the temporary traffic lanes 270A-270B and/or during a period of use of the temporary traffic lanes 270A-270B. For example, the sign 254A can be a sign mounted on one of the objects 220 or 230 or placed near one of the objects 220 or 230, to inform vehicles of the directionality of the temporary traffic lane 270A. In other cases, the computer of the AV 102 may use permanent traffic signs in the scene 200 (e.g., traffic signs implemented prior to the creation and/or need of the temporary traffic lanes 270A-270B and/or intended to remain in the scene 200 after the temporary traffic lanes 270A-270B are removed) such as a stop light in the road at the scene 200, a stop sign at an intersection of the road in the scene 200, etc. For example, the computer of the AV 102 can detect the position of a permanent sign, such as a traffic light, and use the position of the permanent sign as a cue for determining the directionality of the temporary traffic lane 270A and/or the temporary traffic lane 270B.

As another example, the computer of the AV 102 may detect which way the permanent traffic light is facing and/or whether the permanent traffic light is intended to control traffic on a traffic lane overlapping with the temporary traffic lane 270A or the temporary traffic lane 270B, and use such information as a cue for determining directionality. To illustrate, if the computer of the AV 102 detects a traffic light on an intersection at an end of the traffic lane 204, and such traffic light is facing the traffic lane 204 (as opposed to facing away), the computer of the AV 102 can predict that the traffic light is intended to control incoming traffic on the traffic lane 204 (e.g., traffic traveling on the traffic lane 204 towards the traffic light). The computer of the AV 102 can determine that the traffic lane 204 and the temporary traffic lane 270A have a same directionality (for example, based on a determination that the traffic lane 204 overlaps with the temporary traffic lane 270A) and thus can predict the directionality of the temporary traffic lane 270A based on the directionality of the traffic lane 204 determined based on the position/location of the traffic light and/or which way the traffic light is facing.

In some examples, the computer of the AV 102 can additionally or alternatively use information from the HTC 256 to determine a directionality of traffic through the temporary traffic lane 270A. For example, the computer of the AV 102 can use sensor data to determine and recognize any gestures (e.g., pointing in a particular direction, etc.), verbal cues (e.g., verbal instructions), and/or visual cues (e.g., raising or dropping a mobile sign or flag, gesturing stop or go, etc.) from the HTC 256. The computer of the AV 102 can use any recognized gestures, verbal cues, and/or visual cues from the HTC 256 to determine a directionality of the temporary traffic lane 270A. In some cases, the computer of the AV 102 can detect and recognize other instructions from the HTC 256 and use such instructions to manage the behavior of the AV 102 when navigating through the scene 200. For example, the HTC 256 can provide gestures, verbal cues, and/or other visual cues to inform the AV 102 that it needs to stop (or when it needs to stop) or that it needs to go/proceed (or when it needs to go/proceed). The computer of the AV 102 can use sensor data capturing the gestures, verbal cues, and/or other visual cues to detect and recognize such cues and control the behavior of the AV 102 accordingly.

Similarly, the vehicle 262 can use information from the HTC 258 to determine a directionality of traffic through the temporary traffic lane 270B. For example, the vehicle 262 can use sensor data to determine and recognize any gestures, verbal cues, and/or visual cues from the HTC 258. The vehicle 262 can use any recognized gestures, verbal cues, and/or visual cues from the HTC 258 to determine a directionality of the temporary traffic lane 270B.

In some aspects, the computer of the AV 102 can additionally or alternatively use information about the direction/flow of other vehicles in the scene 200 to determine the directionality of the temporary traffic lane 270A and/or the temporary traffic lane 270B. For example, the computer of the AV 102 can detect (e.g., based on sensor collected by one or more sensors of the AV 102) a direction of travel of the vehicle 260, the vehicle 262, and/or the vehicle 264 and use such information to determine a directionality of the temporary traffic lane 270A and/or the temporary traffic lane 270B. To illustrate, the computer of the AV 102 can determine (e.g., based on sensor data) that the vehicle 260 is traveling in a particular direction (e.g., relative to the AV 102) through the temporary traffic lane 270A. The computer of the AV 102 can determine the directionality of the temporary traffic lane 270A based on the determination that the vehicle 260 is traveling in the particular direction through the temporary traffic lane 270A. For example, the computer of the AV 102 can determine that the particular direction of travel of the vehicle 260 through the temporary traffic lane 270A is the direction of travel of the temporary traffic lane 270A.

In another example, the computer of the AV 102 can detect (e.g., from sensor data) the direction of travel of the vehicle 262 and/or the vehicle 264 through the temporary traffic lane 270B. The computer of the AV 102 can then determine the directionality of the temporary traffic lane 270A and/or the temporary traffic lane 270B based on the direction of travel of the vehicle 262 and/or the vehicle 264 through the temporary traffic lane 270B. For example, the computer of the AV 102 may determine that the direction of travel through the temporary traffic lane 270B is the same direction as the detected direction of travel of the vehicle 262 and/or the vehicle 264 through the temporary traffic lane 270B. As another example, the computer of the AV 102 may determine the directionality of the temporary traffic lane 270A based on the direction of travel of the vehicle 262 and/or the vehicle 264 through the temporary traffic lane 270B The computer of the AV 102 may determine or infer that the direction of travel of the temporary traffic lane 270A is an opposite direction of the direction of travel through the temporary traffic lane 270B. Thus, by determining the direction of travel of the vehicle 262 and/or the vehicle 264 through the temporary traffic lane 270B, the computer of the AV 102 can determine or infer that the direction of travel through the temporary traffic lane 270A is the opposite direction of the direction of travel of the vehicle 262 and/or the vehicle 264 through the temporary traffic lane 270B.

To illustrate, if the computer of the AV 102 determines that the vehicle 262 and the vehicle 264 are traveling along the temporary traffic lane 270B in a direction east to west, the computer of the AV 102 may determine that the directionality of the temporary traffic lane 270A is west to east, which is the opposite direction of the vehicle 262 and the vehicle 264 through the temporary traffic lane 270B. In some examples, the computer of the AV 102 may also use other information about the pre-existing traffic lanes (e.g., traffic lanes 202-210) and/or the temporary traffic lanes (e.g., temporary traffic lanes 270A-B) in the scene 200 to infer the directionality of a temporary traffic lane (e.g., temporary traffic lane 270A) in addition to using the directionality of another temporary traffic lane (e.g., temporary traffic lane 270B) and/or the direction of travel of other vehicles through that other temporary traffic lane.

For example, if the computer of the AV 102 determines that the scene 200 includes two temporary traffic lanes and the two temporary traffic lanes allow bidirectional travel in the scene 200, the computer of the AV 102 can infer the directionality of one of the temporary traffic lanes from the other temporary traffic lanes. Here, the computer of the AV 102 can determine that the directionality of the temporary traffic lane 270A is the opposite direction as the direction of travel of the vehicle 262 and the vehicle 264 through the temporary traffic lane 270B (e.g., and thus opposite to the directionality of the temporary traffic lane 270B). In some cases, the computer of the AV 102 may also use information about the directionality of pre-existing traffic lanes (e.g., traffic lanes 202-210) to determine the directionality of one or more temporary traffic lanes. For example, if the scene 200 has two pre-existing traffic lanes that are temporarily being replaced by two temporary traffic lanes, the computer of the AV 102 may use the directionality of the pre-existing traffic lanes to determine the directionality of one or more of the temporary traffic lanes.

To illustrate, if there are two pre-existing traffic lanes in the scene 200 mapped to bidirectional travel, and temporary traffic lane 270A overlaps with one of the pre-existing traffic lanes, the computer of the AV 102 may determine that the directionality of the temporary traffic lane 270A matches the directionality of the pre-existing traffic lane that overlaps with the temporary traffic lane 270A. In the previous example, the computer of the AV 102 may additionally or alternatively determine that the directionality of the temporary traffic lane 270A is opposite to the directionality of another pre-existing traffic lane that overlaps with the second temporary traffic lane in the scene 200, such as temporary traffic lane 270B. In some cases, even if the two temporary traffic lanes in the previous example do not overlap with any pre-existing traffic lanes or if one or more of the temporary traffic lanes overlaps with multiple pre-existing traffic lanes that are mapped to opposite directions of travel (or mapped to the same directionality), the computer of the AV 102 can infer other or additional information about the temporary traffic lanes. For example, if the pre-existing traffic lane on the left relative to the AV 102 is mapped to one direction and the pre-existing traffic lane on the right relative to the AV 102 is mapped to an opposite direction, the computer of the AV 102 can infer that the temporary traffic lane on the left (relative to the AV 102 and the other temporary traffic lane) is for the direction of travel of the pre-existing traffic lane on the left, and the temporary traffic lane on the right (relative to the AV 102 and the other temporary traffic lane) is for the direction of travel of the pre-existing traffic lane on the right, even if such temporary traffic lanes do not overlap with the pre-existing traffic lanes or if a temporary traffic lane overlaps with more than one of the pre-existing traffic lanes.

Figure 4:
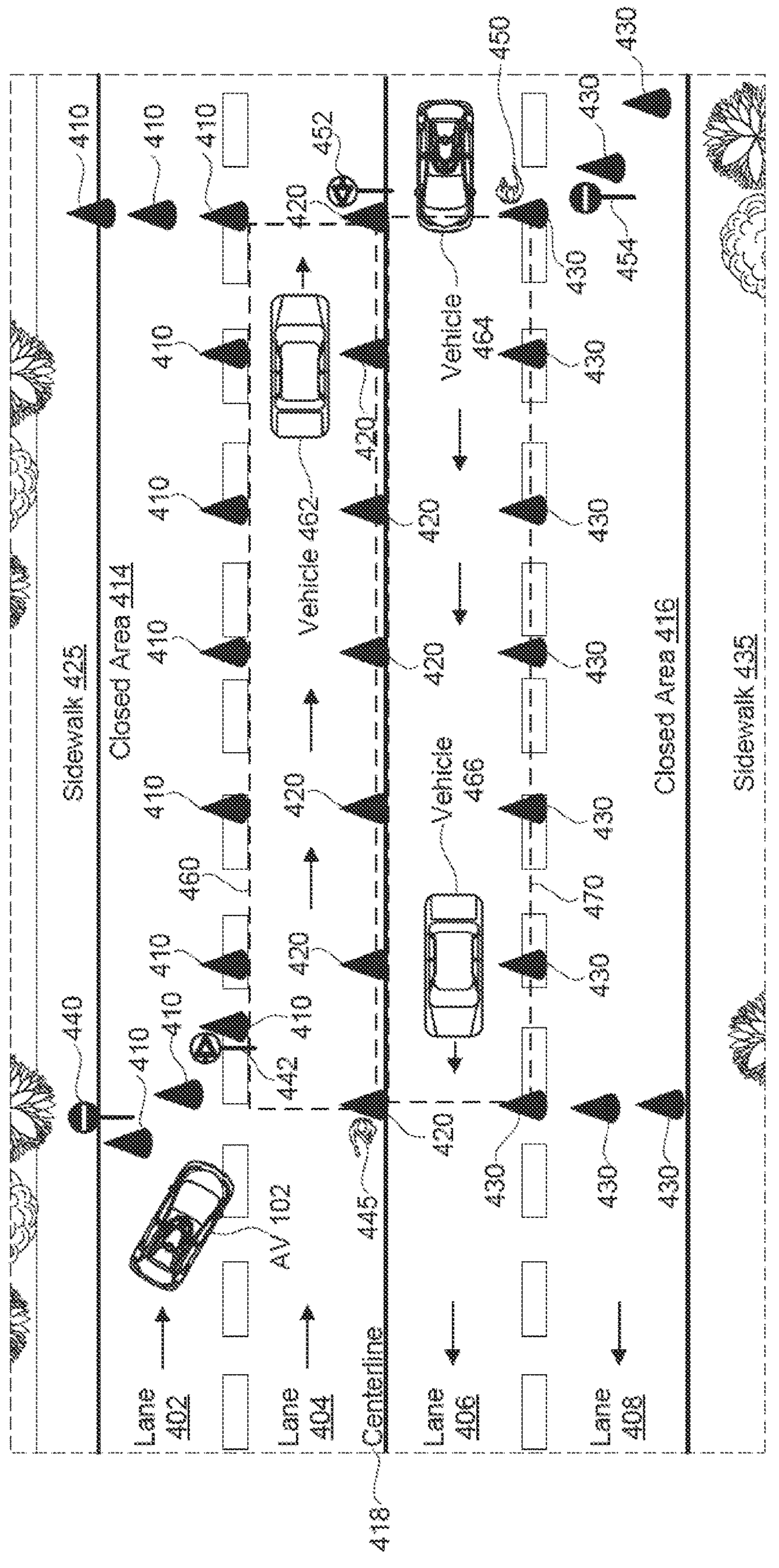

In some aspects, the computer of the AV 102 can additionally or alternatively use other information about the scene 200 to determine a directionality of the temporary traffic lane 270A and/or the temporary traffic lane 270B, and/or determine other attributes of the temporary traffic lane 270A and/or the temporary traffic lane 270B, such as applicable traffic rules, traffic lane geometries, etc. For example, in some cases, the angle and/or position of the objects used to define the boundaries of a temporary traffic lane can indicate the direction of traffic of the temporary traffic lane and/or whether the AV 102 should merge from and/or to a particular direction to enter the temporary traffic lane consistent with a specific directionality of the temporary traffic lane. FIG. 4, which will be further described below, shows an example for determining a directionality of a temporary traffic lane based on the angle and/or position of the objects used to define one or more of the boundaries of the temporary traffic lane.

As another example, the typical directionality of adjacent lanes in a particular jurisdiction can be used as a cue when determining the directionality of temporary traffic lanes in that jurisdiction. To illustrate, in some places such as United States of America, when a road has multiple traffic lanes configured for bidirectional travel (e.g., the road includes one or more traffic lanes for one direction of travel and one or more traffic lanes for an opposite direction of travel), the side of travel for oncoming traffic on such roads (e.g., for vehicles moving in a forward direction from the perspective of such vehicles) is the right side from the perspective of the oncoming traffic (e.g., the right lane(s) from the perspective of vehicles moving in a forward direction), and the side of travel for incoming traffic on such roads is the left side from the perspective of the oncoming traffic (e.g., the left lane(s) from the perspective of vehicles moving in a forward direction). Thus, when an AV in such places detects two temporary traffic lanes for bidirectional travel, the AV can infer that the temporary traffic lane to the right of the other temporary traffic lane(s) from the perspective of oncoming traffic (e.g., from the perspective of the AV when moving or facing in a forward direction) is the temporary traffic lane mapped for oncoming traffic (e.g., mapped for vehicles traveling in a forward direction) and the other temporary traffic lane(s) (e.g., the temporary traffic lane(s) to the left of the temporary traffic lane configured for oncoming traffic) is for incoming traffic from the perspective of the AV and the oncoming traffic.

In other places such as the United Kingdom, when a road has multiple traffic lanes configured for bidirectional travel (e.g., the road includes one or more traffic lanes for one direction of travel and one or more traffic lanes for an opposite direction of travel), the side of travel for oncoming traffic on such roads (e.g., for vehicles moving in a forward direction from the perspective of such vehicles) is the left side from the perspective of the oncoming traffic (e.g., the left lane(s) from the perspective of vehicles moving in a forward direction), and the side of travel for incoming traffic on such roads is the right side from the perspective of the oncoming traffic (e.g., the right lane(s) from the perspective of vehicles moving in a forward direction). Thus, when an AV in such places detects two temporary traffic lanes for bidirectional travel, the AV can infer that the temporary traffic lane to the left of the other temporary traffic lane(s) from the perspective of oncoming traffic (e.g., from the perspective of the AV when moving or facing in a forward direction) is the temporary traffic lane mapped for oncoming traffic (e.g., mapped for vehicles traveling in a forward direction) and the other temporary traffic lane(s) (e.g., the temporary traffic lane(s) to the right of the temporary traffic lane configured for oncoming traffic) is for incoming traffic from the perspective of the AV and the oncoming traffic.

In some aspects, the computer of the AV 102 can additionally or alternatively use the position of the temporary traffic lane 270A (and/or boundaries thereof) and/or the temporary traffic lane 270B (and/or boundaries thereof) relative to the centerline 280 of the road in the scene 200 as a cue for determining the directionality of the temporary traffic lane 270A and/or the temporary traffic lane 270B. For example, traffic on pre-existing traffic lanes on one side of the centerline 280 (e.g., traffic on traffic lanes 202-204) may be mapped to a particular direction, and traffic on pre-existing traffic lanes on another side of the centerline 280 (e.g., traffic on traffic lanes 206-210) may be mapped to a different direction. The computer of the AV 102 may infer that the directionality of the temporary traffic lane 270A matches the directionality of the pre-existing traffic lanes on the same side of the centerline 280 as the temporary traffic lane 270A (e.g., traffic lanes 202-204) and the directionality of the temporary traffic lane 270B matches the directionality of the pre-existing traffic lanes on the same side of the centerline 280 as the temporary traffic lane 270B (e.g., traffic lanes 206-210). In some examples, the centerline 280 can represent a division between pre-existing traffic lanes mapped to one direction and pre-existing traffic lanes mapped to another direction (e.g., between traffic lanes 202-204 and traffic lanes 206-210). In some cases, the centerline 280 can include a visual and/or physical marker and/or object that separates traffic lanes in one direction from traffic lanes in another direction. For example, the centerline 280 can include a median or a solid line painted on the road.

The computer of the AV 102 can additionally or alternatively use sound/noises in the scene 200 to determine the directionality of the temporary traffic lane 270A and/or the temporary traffic lane 270B. For example, the AV 102 may use a microphone to record the sound of vehicles traveling in the scene 200. Based on the recorded sound of vehicles, the computer of the AV 102 may detect whether vehicles are traveling away from the AV 102 or towards the AV 102. If a vehicle on the same lane as the AV 102 is traveling away from the AV 102, the computer of the AV 102 can use the direction traveled by that other vehicle, as determined based on that vehicle traveling away from the AV 102 along the same lane and into a particular traffic lane, to predict the directionality of the temporary traffic lane traveled by that vehicle (and may infer the directionality of the other temporary traffic lane if there are two temporary traffic lanes in the scene). On the other hand, if the other vehicle is traveling on a particular temporary traffic lane and the sound of the vehicle indicates that the vehicle is traveling towards the AV 102, the computer of the AV 102 may predict that the particular temporary traffic lane is for incoming traffic from the perspective of the AV 102.

In a similar example, the computer of the AV 102 may use data from other types of sensors (e.g., in addition to or instead of the microphone) to track the proximity of other vehicles relative to the AV 102. By tracking the proximity of other vehicles, the computer of the AV 102 can determine whether a vehicle is traveling towards the AV 102, away from the AV 102, or in a same direction as the AV 102 (e.g., as determined by the vehicle maintaining a proximity to the AV 102 while the AV 102 moves). Based on the determined direction of travel of other vehicles, the computer of the AV 102 can predict whether the temporary traffic lane 270A is for incoming traffic and the temporary traffic lane 270B is for oncoming traffic, or vice versa.

In some cases, the computer of the AV 102 can also use the number of pre-existing traffic lanes and/or the number of temporary traffic lanes on a road as a cue for determining the directionality of the temporary traffic lanes on the road. For example, in FIG. 2 there are two temporary traffic lanes. Thus, the computer of the AV 102 can determine that one of the temporary traffic lanes is for one direction of travel and the other temporary traffic lane is for the other direction of travel. In some examples, such cue can be used with additional information to determine the particular direction of travel of each temporary traffic lane. For example, in countries where the side of travel for oncoming traffic is the right side as previously explained, if there are two temporary traffic lanes for bidirectional travel on a road, the computer of the AV 102 can determine that the temporary traffic lane to the right of the other temporary traffic lane from the perspective of the AV 102 facing in a forward direction or moving in the forward direction is the temporary traffic lane for oncoming traffic, and the temporary traffic lane to the left of the temporary traffic lane for oncoming traffic is the temporary traffic lane for incoming traffic from the perspective of the AV 102 facing in a forward direction or moving in the forward direction.

Similarly, in countries where the side of travel for oncoming traffic is the left side as previously explained, if there are two temporary traffic lanes for bidirectional travel on a road, the computer of the AV 102 can determine that the temporary traffic lane to the left of the other temporary traffic lane from the perspective of the AV 102 facing in a forward direction or moving in the forward direction is the temporary traffic lane for oncoming traffic, and the temporary traffic lane to the right of the temporary traffic lane for oncoming traffic is the temporary traffic lane for incoming traffic from the perspective of the AV 102 facing in a forward direction or moving in the forward direction. In some examples, the number of lanes can be a cue used in combination with any of the other previously-described cues (and/or any other cues) to determine the directionality of temporary traffic lanes.

As previously noted, some cues may be treated as more authoritative, informative, and/or reliable than other cues. For example, the sign 254A indicating the direction of travel for the temporary traffic lane 270A may be treated as sufficiently authoritative/reliable (e.g., individually dispositive) to determine the directionality of the temporary traffic lane 270A without other cues, and the sign 254B indicating the direction of travel for the temporary traffic lane 270B may be treated as sufficiently authoritative/reliable (e.g., individually dispositive) to determine the directionality of the temporary traffic lane 270B without other cues. Similarly, any gestures, verbal cues, and/or other visual cues from the HTC 256 may be treated as sufficiently authoritative/reliable (e.g., individually dispositive) to determine the directionality of the temporary traffic lane 270A without other cues, and any gestures, verbal cues, and/or other visual cues from the HTC 258 may be treated as sufficiently authoritative/reliable (e.g., individually dispositive) to determine the directionality of the temporary traffic lane 270B without other cues.

On the other hand, other cues such as the number of pre-existing traffic lanes and/or temporary traffic lanes in the scene, the angle/position of objects defining the boundaries of a temporary traffic lane, the geometry of a temporary traffic lane(s) relative to one or more pre-existing traffic lanes, and/or the position of one or more boundaries of a temporary traffic lane relative to the position of one or more boundaries of a pre-existing traffic lane(s) on the road may not be sufficiently authoritative, reliable, and/or informative to treat such cues as individually dispositive and thus determine the directionality of a temporary traffic lane from one of such cues without additional cues/information.

The computer of the AV 102 can use the sensor data collected by one or more sensors of the AV 102 (e.g., sensor system 104, sensor system 106, sensor system 108) to detect one cue or multiple cues for determining aspects of the temporary traffic lanes 270A and/or 270B, such as traffic lane directionality, traffic lane rules, traffic lane geometries, etc. In some examples, the computer of the AV 102 can use, analyze, and/or weight each cue individually and/or in combination with other cues. For example, the computer of the AV 102 can apply a respective weight to each cue or each type of cue it detects in the scene 200 for determining the directionality of a temporary traffic lane.

To illustrate, the computer of the AV 102 can apply a first weight to the directionality information it obtains from the sign 254A and/or the sign 245A for the temporary traffic lane 270A and/or 270B; a second weight to the directionality information it obtains from the HTC 256 and/or the HTC 258 for the temporary traffic lane 270A and/or 270B; a third weight to the directionality information it obtains for the temporary traffic lane 270A and/or 270B based on the detected direction of travel of the vehicle 260, the vehicle 262, and/or the vehicle 264; a fourth weight to the directionality information it obtains for the temporary traffic lane 270A and/or 270B based on the number of pre-existing traffic lanes (e.g., traffic lanes 202-210 in the scene 200 and/or the number of temporary traffic lanes (e.g., temporary traffic lanes 270A-270B) in the scene 200; a fifth weight to the directionality information it obtains for the temporary traffic lane 270A and/or 270B based on the angle and/or position of objects used to define the boundaries of the temporary traffic lane 270A and/or the temporary traffic lane 270B; a sixth weight to the directionality information it obtains for the temporary traffic lane 270A and/or 270B based on the angle and/or position of one or more boundaries of the temporary traffic lane 270A and/or the temporary traffic lane 270B (and/or the angle and/or position of the one or more boundaries relative to the angle and/or position of one or more boundaries of the pre-existing traffic lanes in the scene 200); a seventh weight to the directionality information it obtains based on the traffic directionality rules in a specific country associated with the scene 200 (e.g., in some countries, oncoming traffic travels on a right lane and incoming traffic travels on a left lane, and in other countries, oncoming traffic travels on a left lane and incoming traffic travels on a right lane); an eight weight to directionality information it obtains from the presence (and/or the angle and/or position) of certain vehicles (e.g., emergency vehicles, government vehicles, construction vehicles, department of transportation vehicles, etc.) used to block and/or direct traffic or used as a boundary (or part of a boundary) of a temporary traffic lane; a nineth weight to the directionality information it obtains regarding a pre-existing traffic lane(s) that at least partially overlaps with a temporary traffic lane(s); a tenth weight to the directionality information it obtains based on the position of the temporary traffic lanes 270A and/or 270B relative to the centerline 280; and/or any other weights to any other cues.

A cue can have a different weight or a same or similar weight as one or more other cues used to determine a directionality of a temporary traffic lane. In some examples, the weights applied to cues used by the computer of the AV 102 to determine the directionality of a temporary traffic lane can vary based on one or more factors such as, for example and without limitation, statistics associated with such cues, traffic rules associated with such cues, learned confidences for such cues (e.g., learned via a machine learning model, learned using statistics, learned using heuristics, learned from prior traffic behavior, etc.), loss values calculated for such cues using one or more loss functions, a predictive model, pre-determined confidences, relevant semantic information associated with the scene 200 (and/or portions thereof), one or more rules for determining weights for cues, and/or any other factor. For example, a machine learning model can be trained to learn weights that can be applied to various cues when using such cues to determine the directionality of a temporary traffic lane.

In some cases, a machine learning model can be trained to determine directionality (and/or other information such as traffic rules) using statistics associated with one or more cues, examples of traffic behaviors in other scenes containing temporary traffic lanes, examples of other temporary traffic lanes that have one or more common attributes (e.g., temporary traffic lane geometries, temporary traffic lane configuration, temporary traffic lane boundaries relative to other portions of the scene such as boundaries of pre-existing traffic lanes, etc.), examples of directions of travel of other vehicles within the temporary traffic lanes and/or other temporary traffic lanes, one or more traffic rules associated with a jurisdiction of the scene, example cues (e.g., gestures, audio/verbal cues, and/or other visual cues) from HTCs in other example scenes, one or more signs and/or types of traffic signs in other scenes containing temporary traffic lanes, the angle and/or position of objects used to define the boundaries of the temporary traffic lanes and/or other temporary traffic lanes, examples of other scenes containing temporary traffic lanes, traffic patterns, and/or any other information. In some examples, the machine learning model can use a loss function to calculate a loss for a cue and calibrate a weight applied to the cue based on the calculated loss. The machine learning model can iteratively calibrate the weight associated with the cue until it achieves or reaches a threshold confidence or loss value.

In some cases, the number of cues that can be used to determine a directionality of a temporary traffic lane within a threshold confidence (and/or within a sufficient reliability) can vary based on the weights of cues, the types of cues, the complexity of a scene, prior results, predetermined/preconfigured rules, and/or any other factors. For example, the computer of the AV 102 may have a threshold confidence level that it requires for a directionality determination (e.g., that it requires to rely on a directionality determination) based on detected cues. Thus, the number of cues used or needed to reach that threshold confidence level can vary based on the types of detected cues and the respective weights of the detected cues. For example, in some cases, a single cue may be sufficient to reach the threshold confidence level that allows the computer of the AV 102 to rely on a directionality determination based on that cue. In other cases, n number of cues of certain types may be needed to reach the threshold confidence level that allows the computer of the AV 102 to rely on a directionality determination based on the cues from the n number of cues.

To illustrate, the directionality information obtained for the temporary traffic lane 270A and/or 270B from the sign 254A, the sign 254B, the HTC 256, or the HTC 258 may be sufficient to reach the threshold confidence level that allows the computer of the AV 102 to rely on such directionality information without requiring additional cues. The directionality information obtained for the temporary traffic lane 270A and/or 270B based on the direction of travel of the vehicle 260, the vehicle 262, and/or the vehicle 264 may be sufficient to reach the threshold confidence level without any other cues or with only a threshold number of additional cues. On the other hand, the directionality information obtained for the temporary traffic lane 270A based on the number of pre-existing traffic lanes (e.g., traffic lanes 202-210) and/or the number of temporary traffic lanes in the scene 200, the angle and/or position of objects used to define one or more boundaries of the temporary traffic lane 270A, the position and/or geometry of the temporary traffic lane 270A relative to the position and/or geometry of one or more pre-existing traffic lanes, and/or pre-existing traffic rules associated with the traffic lanes 202-210 may not be sufficient to reach the threshold confidence level without at least a certain number and/or a certain type(s) of additional cues that can validate or corroborate the directionality information obtained from such cues.

In FIG. 2, the temporary traffic lane 270A overlaps and is aligned with traffic lane 204 that is pre-existing on the road in the scene 200, and the temporary traffic lane 270B overlaps and is aligned with traffic lane 206 that is pre-existing on the road in the scene 200. As previously explained, the computer of the AV 102 can use information about the overlap between the temporary traffic lanes 270A-270B and pre-existing traffic lanes as cues for determining the directionality of the temporary traffic lanes 270A-270B. However, in other examples, the temporary traffic lanes may not overlap or align with any pre-existing traffic lanes or a single temporary traffic lane may overlap with multiple pre-existing traffic lanes.

Figure 3:
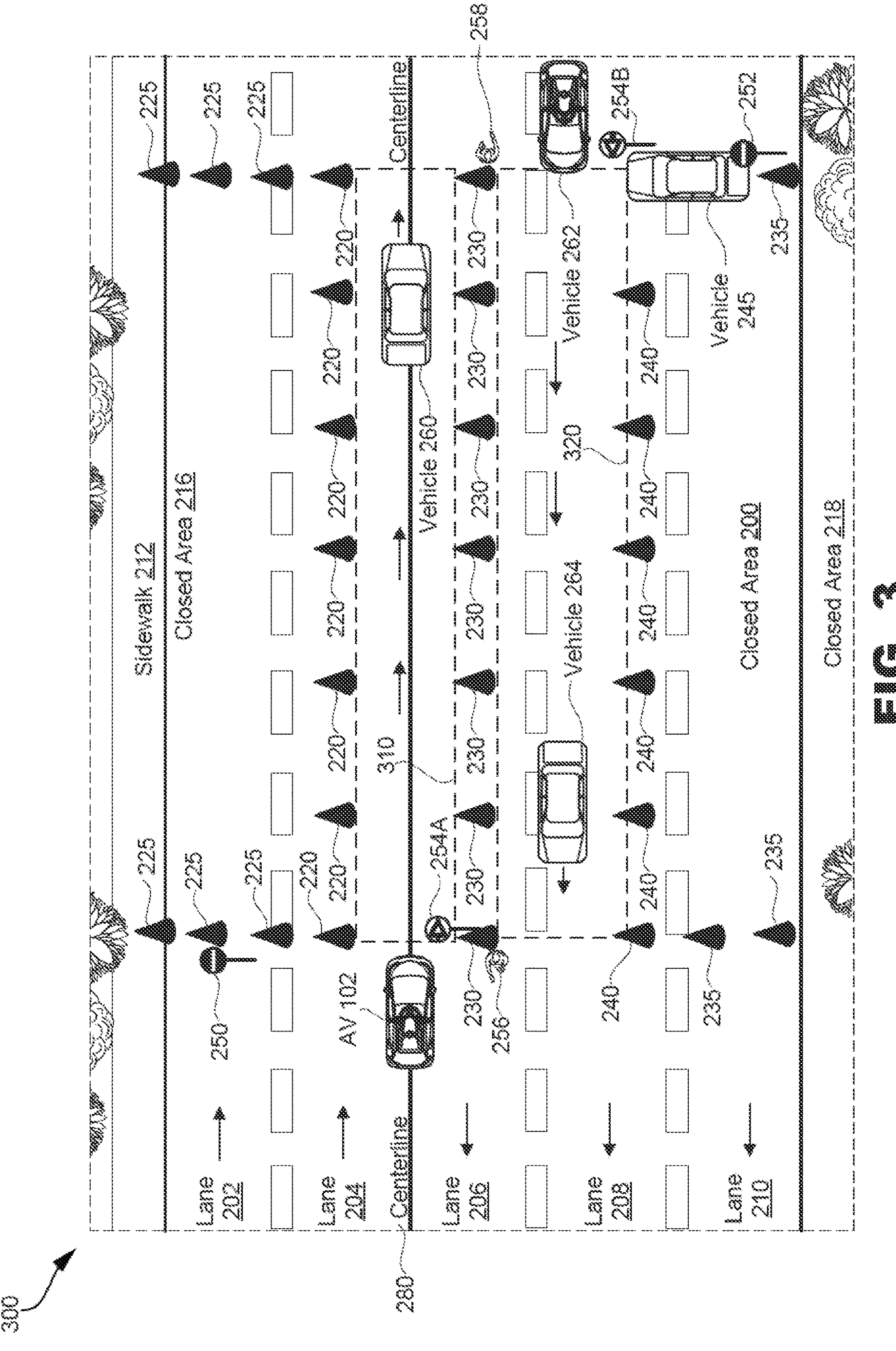

FIG. 3 is a diagram illustrating another example configuration of temporary traffic lanes in a scene 300. In this example, the scene 300 is similar to the scene 200 illustrated in FIG. 2. However, unlike the temporary traffic lane 270A in the scene 200, the temporary traffic lane 310 in the scene 300 is not aligned with the traffic lane 204 (or any other pre-existing traffic lane) and unlike the temporary traffic lane 270B in the scene 200, the temporary traffic lane 320 in the scene 300 is not aligned with the traffic lane 206 (or any other pre-existing traffic lane). Moreover, the temporary traffic lane 310 in the scene 300 crosses the centerline 280 and thus overlaps with a pre-existing traffic lane mapped to one direction (e.g., traffic lane 204) and another pre-existing traffic lane mapped to another direction (e.g., traffic lane 206).

Nevertheless, the computer of the AV 102 can detect the temporary traffic lanes 310 and 320 and their respective directionalities (as well as any other relevant information such as traffic rules, geometries, etc.). For example, the computer of the AV 102 can use sensor data collected by one or more sensor of the AV 102 to detect an indication of a directionality of the temporary traffic lane 310 provided by the sign 254A. The sign 254A in this example indicates a direction of traffic for the temporary traffic lane 310 and can thus be used as a cue to determine the directionality of the temporary traffic lane 310. In some examples, the computer of the AV 102 can infer the directionality of the temporary traffic lane 320 based on the directionality of the temporary traffic lane 310. For example, the computer of the AV 102 may determine that the road in the scene 300 allows for bidirectional traffic. The computer of the AV 102 may also detect two temporary traffic lanes. Thus, the computer of the AV 102 may infer the directionality of one temporary traffic lane based on the directionality of the other temporary traffic lane, an indication that the road in the scene 300 allows for bidirectional traffic, and an indication that the road in the scene 300 includes two temporary traffic lanes.

The computer of the AV 102 can additionally or alternatively can use sensor data collected by the one or more sensor of the AV 102 to detect information provided by the HTC 256 regarding the directionality of the temporary traffic lane 310 and/or the temporary traffic lane 320. The HTC 256 can provide gestures (e.g., pointing in a particular direction, gesturing to proceed or proceed in a certain direction, gesturing to stop, etc.), audio/verbal instructions, and/or other visual cues, which the computer of the AV 102 can detect and use to determine the directionality of the temporary traffic lane 310 and/or the temporary traffic lane 320. In some examples, the computer of the AV 102 can detect audio/verbal cues from the HTC 256 based on acoustic data recorded by a microphone(s) of the AV 102. Moreover, the computer of the AV 102 can detect gestures and/or other visual cues from the HTC 256 based on image data (e.g., one or more still images, a sequence of video frames, etc.) captured by one or more camera sensors of the AV 102. In some cases, the computer of the AV 102 can implement image processing and/or a gesture recognition algorithm to detect gestures and/or visual cues depicted in the image data captured by the one or more camera sensors.

In some examples, the computer of the AV 102 can determine the directionality of the temporary traffic lane 310 and/or 320 in the scene 300 based on the direction of travel of the vehicle 260, the vehicle 262, and/or the vehicle 264. For example, the computer of the AV 102 can determine that the direction of travel of the vehicle 260 on the temporary traffic lane 310 matches the direction of travel set for the temporary traffic lane 310. In some examples, the computer of the AV 102 can instruct the AV 102 to follow lead vehicles (e.g., vehicle 260) ahead of the AV 102 (e.g., in the direction of travel of the AV 102) and avoid entering a temporary traffic lane where other vehicles are traveling in an opposite direction as the AV 102, such as vehicles 262 and 264. Thus, the computer of the AV 102 can predict the directionality of the temporary traffic lane 310 based on the motion of traffic flow through the temporary traffic lane 310 (e.g., based on the direction of travel of the vehicle 260) and the directionality of the temporary traffic lane 320 based on the motion of traffic flow through the temporary traffic lane 320 (e.g., based on the direction of travel of the incoming vehicles 262 and 264).

The computer of the AV 102 can predict the directionality of the temporary traffic lane 310 based on one or more of the foregoing cues despite the temporary traffic lane 310 overlapping with multiple pre-existing traffic lanes having different directionalities and despite the temporary traffic lane 310 crossing the centerline 280. Similarly, computer of the AV 102 can predict the directionality of the temporary traffic lane 320 based on one or more cues despite the temporary traffic lane 320 overlapping with multiple pre-existing traffic lanes (e.g., traffic lanes 206 and 208).

For example, the computer of the AV 102 can predict the directionality of the temporary traffic lane 320 based on an indication of a directionality of the temporary traffic lane 320 provided by the sign 254B. The computer of the AV 102 can additionally or alternatively predict the directionality of the temporary traffic lane 320 based on directionality information obtained from the HTC 258, as previously explained. In some cases, the computer of the AV 102 can additionally or alternatively predict the directionality of the temporary traffic lane 320 based on the direction of travel of the vehicle 260 on the temporary traffic lane 310 (e.g., incoming traffic on the temporary traffic lane 310 can indicate that the directionality of the temporary traffic lane 320 corresponds to the opposite direction) and/or the vehicles 262 and/or 264 on the temporary traffic lane 320.

In some examples, the computer of the AV 102 can infer the directionality of the temporary traffic lane 310 based on the directionality of the temporary traffic lane 320. For example, the computer of the AV 102 may determine that the road in the scene 300 allows for bidirectional traffic. The computer of the AV 102 may also detect two temporary traffic lanes. Thus, the computer of the AV 102 may infer the directionality of one temporary traffic lane based on the directionality of the other temporary traffic lane, an indication that the road in the scene 300 allows for bidirectional traffic, and an indication that the road in the scene 300 includes two temporary traffic lanes.

FIG. 4 is a diagram illustrating another example configuration of temporary traffic lanes in a scene 400. In this example, the scene 400 includes two pre-existing traffic lanes on one side of the centerline 418, including traffic lanes 402 and 404, and two pre-existing traffic lanes on another side of the centerline 418, including traffic lanes 406 and 408. Traffic lanes 402 and 404 are configured for traffic in one direction and traffic lanes 406 and 408 are configured for traffic in an opposite direction.

The scene 400 includes a closed area 414 adjacent to the sidewalk 425, and a closed area 416 adjacent to the sidewalk 435. The boundaries of the closed area 414 are defined by the objects 410 and the boundary (e.g., the curb) of the sidewalk 425. The boundaries of the closed area 416 are defined by the objects 430 and the boundary (e.g., the curb) of the sidewalk 435. In some examples, the closed area 414 can also include a sign 440 indicating that the area associated with the closed area 414 is closed to traffic, and/or the closed area 416 can also include a sign 454 indicating that the area associated with the closed area 416 is closed to traffic.

In addition to defining a border/boundary of the closed area 414, the objects 410 also define a boundary/border of the temporary traffic lane 460. The other boundary/border of the temporary traffic lane 460 is defined by the objects 420. Similarly, in addition to defining a border/boundary of the closed area 416, the objects 430 also define a boundary/border of the temporary traffic lane 470. The other boundary/border of the temporary traffic lane 470 is defined by the objects 420. Thus, the temporary traffic lane 460 and the temporary traffic lane 470 in this example share a border/boundary, which is defined by the objects 420.

The AV 102 can collect sensor data in the scene 400 and use the sensor data to detect one or more cues that the AV 102 can use to predict a directionality of the temporary traffic lane 460 and/or the temporary traffic lane 470. For example, as previously discussed, the computer of the AV 102 can detect the directionality of the temporary traffic lane

460 based on a directionality indication detected from the sign 442, information (e.g., gestures, audio/verbal instructions, and/or other visual cues) from the HTC 445, and/or the direction of travel of the vehicle 462 on the temporary traffic lane 460 and/or the direction of travel of the vehicle 464 and/or 466 on the temporary traffic lane 470. Similarly, the computer of the AV 102 can detect the directionality of the temporary traffic lane 470 based on a directionality indication detected from the sign 452, information (e.g., gestures, audio/verbal instructions, and/or other visual cues) from the HTC 450, and/or the direction of travel of the vehicle 462 on the temporary traffic lane 460 and/or the direction of travel of the vehicle 464 and/or 466 on the temporary traffic lane 470.

In some examples, the computer of the AV 102 can detect the angle and/or position of the objects used to define the boundaries of the temporary traffic lane 460 and/or the temporary traffic lane 470, and use such information to predict the directionality of the temporary traffic lane 460 and/or the temporary traffic lane 470. For example, the first three of the objects 410 closest to the AV 102 are angled and positioned in a curve that begins on traffic lane 402 and merges into traffic lane 404, which overlaps with the temporary traffic lane 460. The computer of the AV 102 can detect this configuration of the objects 410 based on sensor data depicting the objects and determine that such configuration of the objects (e.g., the angle and/or position of the first three objects) indicates that vehicles from the traffic lane 402 should merge into the temporary traffic lane 460 that overlaps with the traffic lane 404. Based on this information, the computer of the AV 102 can determine that the directionality of the temporary traffic lane 460 matches the directionality of the traffic lane 402.

In some examples, the computer of the AV 102 can take into consideration a determination that the traffic lanes 402 and 404 have a same directionality. For example, if the computer of the AV 102 determines that the angle and/or position of the first three of the objects 410 signals a merging of vehicles from the traffic lane 402 to the temporary traffic lane 460 and that the traffic lane 402 and the traffic lane 404, which overlaps with the temporary traffic lane 460, have a same directionality, then the computer of the AV 102 can predict that by signaling that vehicles should merge from the traffic lane 402 to the temporary traffic lane 460, the angle and/or position of the first three of the objects 410 also indicates that the directionality of the temporary traffic lane 460 matches the directionality of the traffic lane 402. The computer of the AV 102 can thus determine the directionality of the temporary traffic lane 460 based on the directionality of the traffic lane 402 and the inference from the angle and/or position of the first three of the objects 410 signaling the merge from the traffic lane 402 to the temporary traffic lane 460.

In some cases, the directionality of the temporary traffic lane 460 can be used to predict the directionality of the temporary traffic lane 470. For example, if the road in the scene 400 allows for bidirectional travel and the computer of the AV 102 determines that the scene 400 includes two temporary traffic lanes, the computer of the AV 102 may predict that the directionality of the temporary traffic lane 470 is the opposite direction as the directionality of the temporary traffic lane 460.

As shown in FIG. 4, the first three of the objects 430 closest to the vehicle 464 are angled and positioned in a curve that begins on traffic lane 408 and merges into traffic lane 406, which overlaps with the temporary traffic lane 470. The computer of the AV 102 (and/or the vehicle 464) can detect this configuration of the objects 430 based on sensor data depicting the objects and determine that such configuration of the objects (e.g., the angle and/or position of the first three objects) indicates that vehicles from the traffic lane 408 should merge into the temporary traffic lane 470 that overlaps with the traffic lane 406. Based on this information, the computer of the AV 102 (and/or the vehicle 464) can determine that the directionality of the temporary traffic lane 470 matches the directionality of the traffic lane 408.

In some cases, a single boundary of objects can define multiple temporary traffic lanes. Moreover, the angle and/or position for at least some of the objects may be used as a cue to predict the directionality of the multiple temporary traffic lanes.

Figure 5:
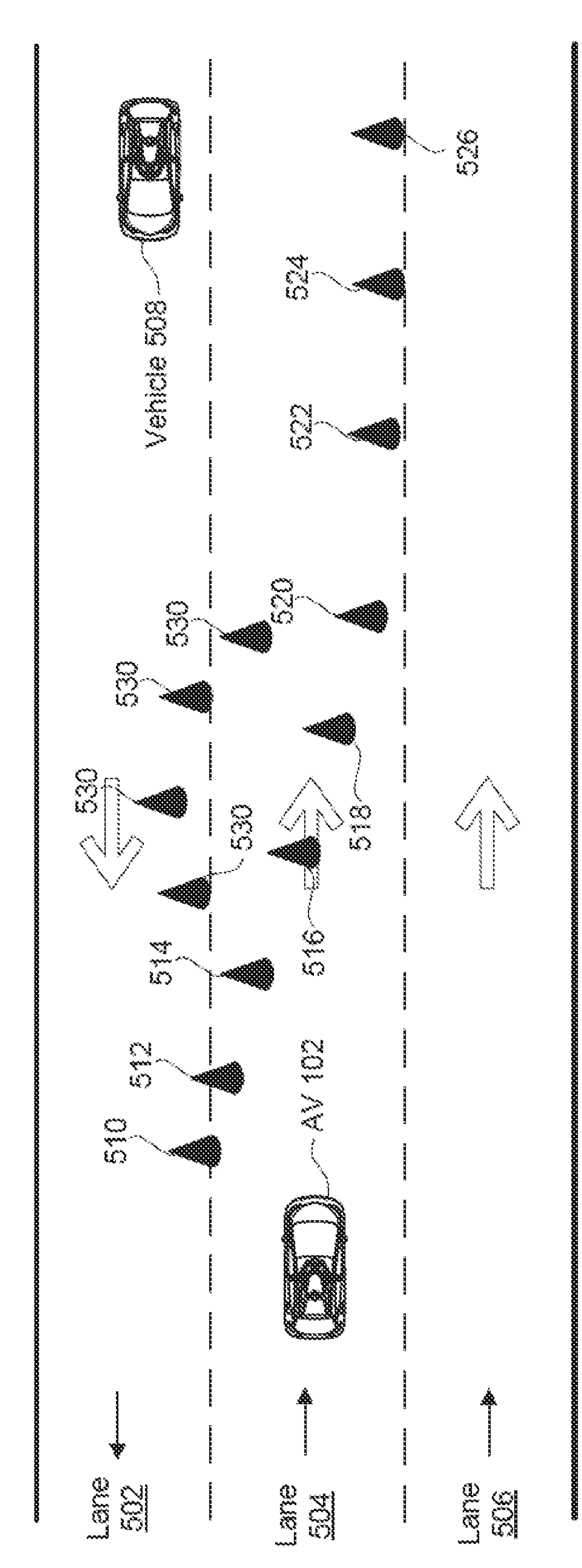

FIG. 5 is a diagram illustrating another example configuration of temporary traffic lanes in a scene 500. In this example, the road in the scene 500 includes a pre-existing traffic lane 502 mapped to one direction of travel, and two pre-existing traffic lanes 504-506 mapped to an opposite direction of travel.

The objects 510-526 define the boundary between a temporary traffic lane that overlaps with the pre-existing traffic lane 502 and a temporary traffic lane that overlaps with the pre-existing traffic lane 506. Thus, the objects 510-526 provides a common boundary that is used to define and/or detect both of the temporary traffic lanes in the scene 500.

AV 102 is shown in FIG. 5 traveling along the pre-existing traffic lane 504. The objects 510-520 are angled and/or positioned so as to guide vehicles traveling in the pre-existing traffic lane 504 to merge onto the temporary traffic lane created by the objects 510-526 that overlaps with the pre-existing traffic lane 506. The computer of the AV 102 can detect, based on sensor data (e.g., image data, LIDAR data, RADAR data, etc.), that the objects 510-520 are angled and/or positioned so as to guide vehicles traveling in the pre-existing traffic lane 504 to merge onto the temporary traffic lane created by the objects 510-526 that overlaps with the pre-existing traffic lane 506. Thus, based on the angle and/or position of the objects 510-520, the computer of the AV 102 can detect the directionality of the temporary traffic lane created by the objects 510-526 that overlaps with the pre-existing traffic lane 506. For example, the computer of the AV 102 can predict that the directionality of the temporary traffic lane created by the objects 510-526 that overlaps with the pre-existing traffic lane 506 matches the directionality of the pre-existing traffic lane 504 (and the pre-existing traffic lane 506).

Moreover, the vehicle 508 is shown in FIG. 5 traveling along the traffic lane 502. A computer of the vehicle 508 can detect (e.g., based on data from one or more sensors of the vehicle 508) the position and/or angle of the objects 510-526 used to form the boundary of the temporary traffic lanes in the scene 500. In this example, the objects 530 are used to create a closed area around a portion of the traffic lane 502 and a portion of the traffic lane 504. The computer of the vehicle 508 can detect the position and/or angle of the objects 530 and determine that a portion of the traffic lane 502 is closed to traffic and the vehicle 508 needs to maneuver around the objects 530 and within the traffic lane 502 to avoid the portion of the traffic lane 502 closed by the objects 530.

FIG. 6 is a flowchart illustrating an example process 600 for determining directionality of temporary traffic lanes in a scene. At block 602, the process 600 can include detecting, based on sensor data from one or more sensors (e.g., sensor system 104, sensor system 106, sensor system 108) of a vehicle (e.g., AV 102), a temporary traffic lane (e.g., temporary traffic lane 270A, temporary traffic lane 270B, temporary traffic lane 310, temporary traffic lane 460, etc.) on a road configured for use by traffic to navigate the road in lieu of one or more pre-existing traffic lanes (e.g., traffic lane 202, traffic lane 204, traffic lane 206, traffic lane 208, traffic lane 210) on the road. In some examples, at least one boundary of the temporary traffic lane is defined by a plurality of objects on the road. For example, the plurality of objects on the road can define both boundaries of the temporary traffic lane or one of the boundaries of the temporary traffic lane. In some cases, the plurality of objects define one of the boundaries of the temporary traffic lane and the other boundary of the temporary traffic lane is defined by a curb of a sidewalk or a vehicle parked in a particular location.

In some cases, the sensor data can include data from a light detection and ranging sensor, data from a radio detection and ranging sensor, image data from a camera sensor, data from a time-of-flight sensor, data from an infrared sensor, and/or data from an acoustic sensor.

At block 604, the process 600 can include detecting, based on the sensor data, one or more cues indicating a directionality of the temporary traffic lane based on a first indication of a direction of travel of a vehicle traveling through the temporary traffic lane or an adjacent temporary traffic lane, a second indication of directionality provided by a human traffic controller in a scene associated with the road, and/or a third indication of directionality predicted based on one or more objects on the road.

At block 606, the process 600 can include predicting, by a computer (e.g., local computing device 110) of the vehicle, the directionality of the temporary traffic lane based on the one or more cues. In some examples, predicting the directionality of the temporary traffic lane can include determining a direction of traffic configured for the temporary traffic lane. For example, predicting the directionality of the temporary traffic lane can include determining whether the temporary traffic lane is for incoming traffic or oncoming traffic relative to the vehicle. In some cases, predicting the directionality of the temporary traffic lane can include predicting a different directionality of the adjacent temporary traffic lane based on the directionality of the temporary traffic lane. For example, the computer of the vehicle can predict that the different directionality of the adjacent temporary traffic lane is the opposite direction as the directionality of the temporary traffic lane.

In some examples, the one or more objects can include a sign placed in the scene to direct traffic through the temporary traffic lane and/or the adjacent temporary traffic lane. In some aspects, the process 600 can include detecting, based on image data in the sensor data, a visual cue in the sign; recognizing the visual cue as a visual indication of the directionality of the temporary traffic lane and/or a different directionality of the adjacent temporary traffic lane. In some examples, determining the directionality of the temporary traffic lane can include determining the directionality of the temporary traffic lane based on the visual cue.

In some cases, recognizing the visual cue as the visual indication of the directionality of the temporary traffic lane and/or the different directionality of the adjacent temporary traffic lane can include recognizing the visual cue as the visual indication of the different directionality of the adjacent temporary traffic lane. In some aspects, the process 600 can include determining a direction that is opposite to the different directionality of the adjacent temporary traffic lane; and determining the directionality of the temporary traffic lane based on the direction that is opposite to the different directionality of the adjacent temporary traffic lane.

In some examples, the second indication of directionality provided by the human traffic controller can include a gesture of the human traffic controller and/or a verbal instruction of the human traffic controller. In some cases, the gesture of the human traffic controller can include pointing in a particular direction in association with the temporary traffic lane and/or the adjacent temporary traffic lane. In some aspects, the process 600 can include recognizing, based on image data in the sensor data, the gesture as pointing in the particular direction in association with the temporary traffic lane and/or the adjacent temporary traffic lane; and determining the directionality of the temporary traffic lane based on the gesture of the human traffic controller pointing in the particular direction in association with the temporary traffic lane and/or the adjacent temporary traffic lane.

In some examples, the second indication of directionality provided by the human traffic controller can include the verbal instruction, and the process 600 can include based on recorded audio in the sensor data, recognizing, using a speech recognition algorithm, the verbal instruction of the human traffic controller; and determining the directionality of the temporary traffic lane based on the verbal instruction of the human traffic controller.

In some examples, the first indication of the direction of travel of the vehicle traveling through the temporary traffic lane or the adjacent temporary traffic lane indicates the direction of travel of the vehicle through the temporary traffic lane, and determining the directionality of the temporary traffic lane can include predicting the directionality of the temporary traffic lane at least partly based on the direction of travel of the vehicle through the temporary traffic lane.

In some aspects, the process 600 can include determining a position and/or an angle of a first set of objects from the one or more objects on the road. In some examples, the first set of objects are located at an end of the at least one boundary of the temporary traffic lane. For example, the first set of objects can include the first or last n number of objects in the boundary. In some aspects, the process 600 can include determining that vehicles traveling from a pre-existing traffic lane should merge onto the temporary traffic lane based on the position and/or the angle of the first set of objects from the one or more objects on the road; and predicting the directionality of the temporary traffic lane at least partly based the determination that vehicles traveling from the pre-existing traffic lane should merge onto the temporary traffic lane. In some examples, the directionality of the temporary traffic lane matches a particular direction of travel associated with the pre-existing traffic lane.

In some aspects, the process 600 can include assigning respective weights to the one or more cues; and predicting the directionality of the temporary traffic lane based on the respective weights and directionality information associated with the one or more cues. In some examples, each cue can be assigned a respective weight, and each respective weight is indicative of a confidence level of a reliability of directionality information determined from the cue associated with the respective weight.

Figure 7:
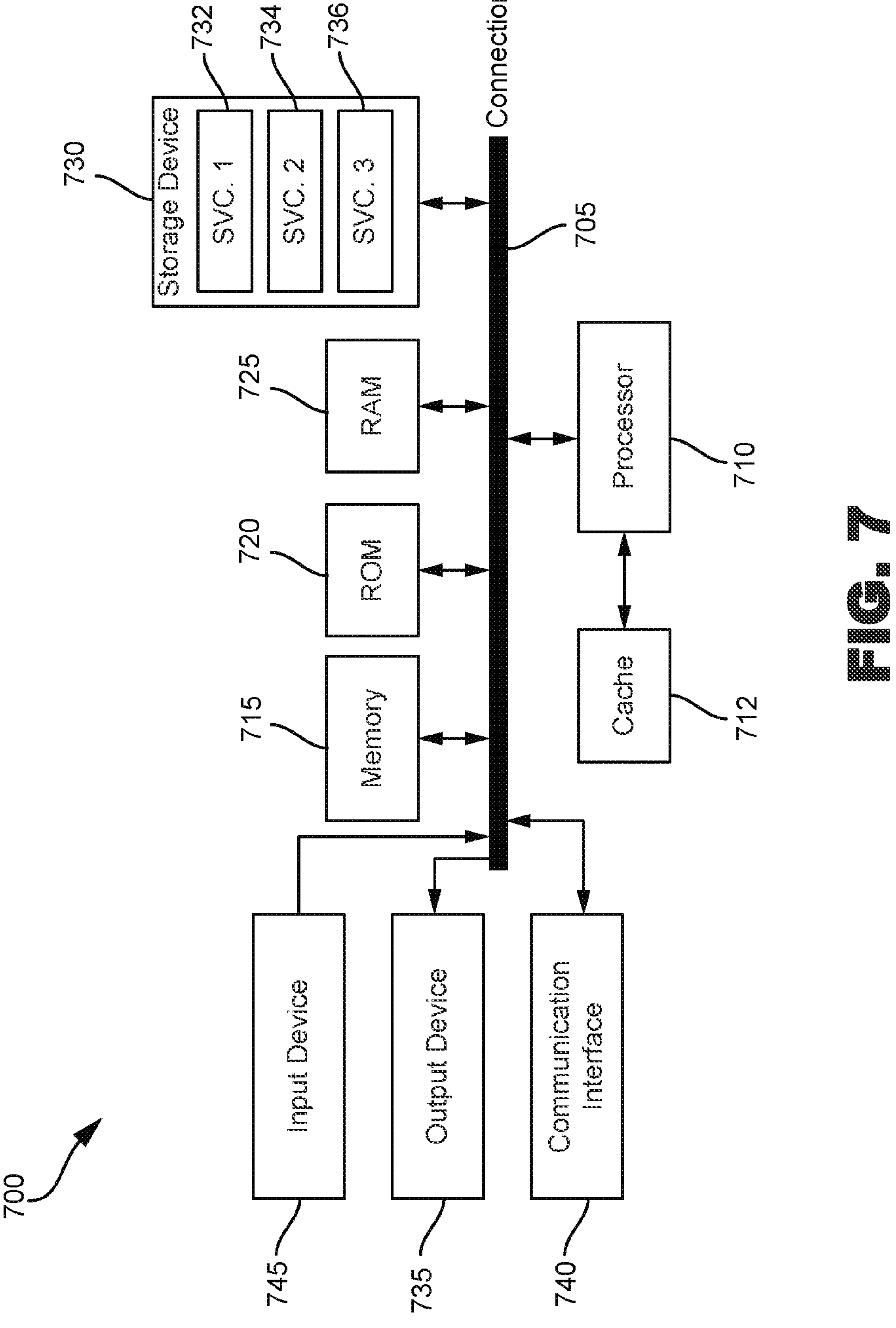
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up local computing device 110, remote computing system 190, a passenger device (e.g., client computing device 170) executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: detect, based on sensor data from one or more sensors of a vehicle, a temporary traffic lane on a road configured for use by traffic to navigate the road in lieu of one or more pre-existing traffic lanes on the road, wherein at least one boundary of the temporary traffic lane is defined by a plurality of objects on the road; detect, based on the sensor data, one or more cues indicating a directionality of the temporary traffic lane based on at least one of a first indication of a direction of travel of a vehicle traveling through the temporary traffic lane or an adjacent temporary traffic lane, a second indication of directionality provided by a human traffic controller in a scene associated with the road, and a third indication of directionality predicted based on one or more objects on the road; and predict the directionality of the temporary traffic lane based on the one or more cues.

Aspect 2. The system of Aspect 1, wherein the one or more objects comprises a sign placed in the scene to direct traffic through at least one of the temporary traffic lane and the adjacent temporary traffic lane, wherein the one or more processors are further configured to: detect, based on image data in the sensor data, a visual cue in the sign; recognize the visual cue as a visual indication of at least one of the directionality of the temporary traffic lane and a different directionality of the adjacent temporary traffic lane; and predict the directionality of the temporary traffic lane based on the visual cue.

Aspect 3. The system of Aspect 2, wherein recognizing the visual cue as the visual indication of at least one of the directionality of the temporary traffic lane and the different directionality of the adjacent temporary traffic lane comprises recognizing the visual cue as the visual indication of the different directionality of the adjacent temporary traffic lane, wherein the one or more processors are further configured to: determine a direction that is opposite to the different directionality of the adjacent temporary traffic lane; and predict the directionality of the temporary traffic lane based on the direction that is opposite to the different directionality of the adjacent temporary traffic lane.

Aspect 4. The system of any of Aspects 1 to 3, wherein the second indication of directionality provided by the human traffic controller comprises at least one of a gesture of the human traffic controller and a verbal instruction of the human traffic controller.

Aspect 5. The system of Aspect 4, wherein the gesture of the human traffic controller comprises pointing in a particular direction in association with at least one of the temporary traffic lane and the adjacent temporary traffic lane, and wherein the one or more processors are further configured to: recognize, based on image data in the sensor data, the gesture as pointing in the particular direction in association with at least one of the temporary traffic lane and the adjacent temporary traffic lane; and predict the directionality of the temporary traffic lane based on the gesture of the human traffic controller pointing in the particular direction in association with at least one of the temporary traffic lane and the adjacent temporary traffic lane.

Aspect 6. The system of any of Aspects 4 or 5, wherein the second indication of directionality provided by the human traffic controller comprises the verbal instruction, and wherein the one or more processors are further configured to: based on recorded audio in the sensor data, recognize, using a speech recognition algorithm, the verbal instruction of the human traffic controller; and predict the directionality of the temporary traffic lane based on the verbal instruction of the human traffic controller.

Aspect 7. The system of any of Aspects 1 to 6, wherein the first indication of the direction of travel of the vehicle traveling through the temporary traffic lane or the adjacent temporary traffic lane indicates the direction of travel of the vehicle through the temporary traffic lane, and wherein predicting the directionality of the temporary traffic lane comprises predicting the directionality of the temporary traffic lane at least partly based on the direction of travel of the vehicle through the temporary traffic lane.

Aspect 8. The system of any of Aspects 1 to 7, wherein the first indication of the direction of travel of the vehicle traveling through the temporary traffic lane or the adjacent temporary traffic lane indicates the direction of travel of the vehicle through the adjacent temporary traffic lane, and wherein predicting the directionality of the temporary traffic lane comprises: determining a direction that is opposite to the direction of travel of the vehicle through the adjacent temporary traffic lane; and predicting the directionality of the temporary traffic lane at least partly based on the direction that is opposite to the direction of travel of the vehicle through the adjacent temporary traffic lane.

Aspect 9. The system of any of Aspects 1 to 8, wherein the one or more processors are configured to: determine at least one of a position and an angle of a first set of objects from the one or more objects on the road, wherein the first set of objects are located at an end of the at least one boundary of the temporary traffic lane; determine that vehicles traveling from a pre-existing traffic lane should merge onto the temporary traffic lane based on at least one of the position and the angle of the first set of objects from the one or more objects on the road; and predict the directionality of the temporary traffic lane at least partly based the determination that vehicles traveling from the pre-existing traffic lane should merge onto the temporary traffic lane, wherein the directionality of the temporary traffic lane matches a particular direction of travel associated with the pre-existing traffic lane.

Aspect 10. The system of any of Aspects 1 to 9, wherein the one or more processors are configured to: assign respective weights to the one or more cues, each cue being assigned a respective weight, wherein each respective weight is indicative of a confidence level of a reliability of directionality information determined from the cue associated with the respective weight; and predict the directionality of the temporary traffic lane based on the respective weights and directionality information associated with the one or more cues, wherein the sensor data comprises at least one of data from a light detection and ranging sensor, data from a radio detection and ranging sensor, image data from a camera sensor, data from a time-of-flight sensor, data from an infrared sensor, and data from an acoustic sensor.

Aspect 11. A method comprising: detecting, based on sensor data from one or more sensors of a vehicle, a temporary traffic lane on a road configured for use by traffic to navigate the road in lieu of one or more pre-existing traffic lanes on the road, wherein at least one boundary of the temporary traffic lane is defined by a plurality of objects placed on the road; detecting, based on the sensor data, one or more cues indicating a directionality of the temporary traffic lane based on at least one of a first indication of a direction of travel of a vehicle traveling through the temporary traffic lane or an adjacent temporary traffic lane, a second indication of directionality provided by a human traffic controller in a scene associated with the road, and a third indication of directionality predicted based on one or more objects on the road; and predicting, by a computer of the vehicle, the directionality of the temporary traffic lane based on the one or more cues.

Aspect 12. The method of Aspect 11, wherein the one or more objects comprises a sign placed in the scene to direct traffic through at least one of the temporary traffic lane and the adjacent temporary traffic lane, wherein the method further comprises: detecting, based on image data in the sensor data, a visual cue in the sign; recognizing the visual cue as a visual indication of at least one of the directionality of the temporary traffic lane and a different directionality of the adjacent temporary traffic lane; and predicting the directionality of the temporary traffic lane based on the visual cue.

Aspect 13. The method of Aspect 12, wherein recognizing the visual cue as the visual indication of at least one of the directionality of the temporary traffic lane and the different directionality of the adjacent temporary traffic lane comprises recognizing the visual cue as the visual indication of the different directionality of the adjacent temporary traffic lane, wherein the method further comprises: determining a direction that is opposite to the different directionality of the adjacent temporary traffic lane; and predicting the directionality of the temporary traffic lane based on the direction that is opposite to the different directionality of the adjacent temporary traffic lane.

Aspect 14. The method of any of Aspects 11 to 13, wherein the second indication of directionality provided by the human traffic controller comprises at least one of a gesture of the human traffic controller and a verbal instruction of the human traffic controller.

Aspect 15. The method of Aspect 14, wherein the gesture of the human traffic controller comprises pointing in a particular direction in association with at least one of the temporary traffic lane and the adjacent temporary traffic lane, and wherein the method further comprises: recognizing, based on image data in the sensor data, the gesture as pointing in the particular direction in association with at least one of the temporary traffic lane and the adjacent temporary traffic lane; and predicting the directionality of the temporary traffic lane based on the gesture of the human traffic controller pointing in the particular direction in association with at least one of the temporary traffic lane and the adjacent temporary traffic lane.

Aspect 16. The method of Aspect 14, wherein the second indication of directionality provided by the human traffic controller comprises the verbal instruction, and wherein the method further comprises: based on recorded audio in the sensor data, recognizing, using a speech recognition algorithm, the verbal instruction of the human traffic controller; and predicting the directionality of the temporary traffic lane based on the verbal instruction of the human traffic controller.

Aspect 17. The method of any of Aspects 11 to 16, wherein the first indication of the direction of travel of the vehicle traveling through the temporary traffic lane or the adjacent temporary traffic lane indicates the direction of travel of the vehicle through the temporary traffic lane, and wherein predicting the directionality of the temporary traffic lane comprises predicting the directionality of the temporary traffic lane at least partly based on the direction of travel of the vehicle through the temporary traffic lane.

Aspect 18. The method of any of Aspects 11 to 17, further comprising: determining at least one of a position and an angle of a first set of objects from the one or more objects on the road, wherein the first set of objects are located at an end of the at least one boundary of the temporary traffic lane; determining that vehicles traveling from a pre-existing traffic lane should merge onto the temporary traffic lane based on at least one of the position and the angle of the first set of objects from the one or more objects on the road; and predicting the directionality of the temporary traffic lane at least partly based the determination that vehicles traveling from the pre-existing traffic lane should merge onto the temporary traffic lane, wherein the directionality of the temporary traffic lane matches a particular direction of travel associated with the pre-existing traffic lane.

Aspect 19. The method of any of Aspects 11 to 18, further comprising: assigning respective weights to the one or more cues, each cue being assigned a respective weight, wherein each respective weight is indicative of a confidence level of a reliability of directionality information determined from the cue associated with the respective weight; and predicting the directionality of the temporary traffic lane based on the respective weights and directionality information associated with the one or more cues, wherein the sensor data comprises at least one of data from a light detection and ranging sensor, data from a radio detection and ranging sensor, image data from a camera sensor, data from a time-of-flight sensor, data from an infrared sensor, and data from an acoustic sensor.

Aspect 20. A non-transitory computer-readable medium having stored thereon instructions which, when executed by one or more processors, cause the one or more processors to perform a method according to any of Aspects 11 to 19.

Aspect 21. A system comprising means for performing a method according to any of Aspects 11 to 19.

Aspect 22. A computer-program product comprising instructions which, when executed by one or more processors, cause the one or more processors to perform a method according to any of Aspects 11 to 19.

What is claimed is:

1. A system comprising:

a memory; and one or more processors coupled to the memory, the one or more processors being configured to:

detect, based on sensor data from one or more sensors of a vehicle, a temporary traffic lane on a road configured for use by traffic to navigate the road in lieu of one or more pre-existing traffic lanes on the road, wherein at least one boundary of the temporary traffic lane is defined by a plurality of objects on the road;

detect, based on the sensor data, one or more cues indicating a direction of travel through the temporary traffic lane based on:

a first indication of a direction of travel of a vehicle traveling through the temporary traffic lane or an adjacent temporary traffic lane, a second indication of the direction of travel through the temporary traffic lane or a second direction of travel through the adjacent temporary traffic lane, provided by a human traffic controller in a scene associated with the road, and a third indication of the direction of travel through the temporary traffic lane or the direction of travel through the adjacent temporary traffic lane, predicted based on one or more objects on the road, wherein:

the one or more cues comprise a first cue associated with the first indication, a second cue associated with the second indication, and a third cue associated with the third indication, the one or more objects on the road comprise a sign placed in the scene to direct traffic through at least one of the temporary traffic lane and the adjacent temporary traffic lane, and in detecting the one or more cues, the one or more processors are configured to detect, based on image data in the sensor data, a visual cue in the sign;

assign respective weights to the first cue associated with the first indication, the second cue associated with the second indication, and the third cue associated with the third indication, wherein each respective weight among the respective weights is indicative of a confidence level of a reliability of a direction of travel determined from the cue associated with the respective weight;

recognize the visual cue as a visual indication of at least one of the direction of travel through the temporary traffic lane and the second direction of travel through the adjacent temporary traffic lane, wherein the direction of travel through the adjacent temporary traffic lane is different from the direction of travel through the temporary traffic lane; and predict the direction of travel through the temporary traffic lane or the direction of travel through the adjacent temporary traffic lane based on;

combining direction of travel information respectively corresponding to the first cue associated with the first indication, the second cue associated with the second indication, and the third cue associated with the third indication; and the respective weights assigned to the first cue associated with the first indication, the second cue associated with the second indication, and the third cue associated with the third indication.

2. The system of claim 1, wherein recognizing the visual cue as the visual indication of at least one of the direction of travel through the temporary traffic lane and the second direction of travel through the adjacent temporary traffic lane comprises recognizing the visual cue as the visual indication of the second direction of travel through the adjacent temporary traffic lane, wherein the one or more processors are further configured to:

determine a direction that is opposite to the second direction of travel through the adjacent temporary traffic lane; and predict the direction of travel through the temporary traffic lane based on the direction that is opposite to the second direction of travel through the adjacent temporary traffic lane.

3. The system of claim 1, wherein the second indication of directionality provided by the human traffic controller comprises at least one of a gesture of the human traffic controller and a verbal instruction of the human traffic controller.

4. The system of claim 3, wherein the gesture of the human traffic controller comprises pointing in a particular direction in association with at least one of the temporary traffic lane and the adjacent temporary traffic lane, and wherein the one or more processors are further configured to:

recognize, based on image data in the sensor data, the gesture as pointing in the particular direction in association with at least one of the temporary traffic lane and the adjacent temporary traffic lane; and predict the direction of travel through the temporary traffic lane based on the gesture of the human traffic controller pointing in the particular direction in association with at least one of the temporary traffic lane and the adjacent temporary traffic lane.

5. The system of claim 3, wherein the second indication of directionality provided by the human traffic controller comprises the verbal instruction, and wherein the one or more processors are further configured to:

based on recorded audio in the sensor data, recognize, using a speech recognition algorithm, the verbal instruction of the human traffic controller; and predict the direction of travel through the temporary traffic lane based on the verbal instruction of the human traffic controller.

6. The system of claim 1, wherein the first indication of the direction of travel of the vehicle traveling through the temporary traffic lane or the adjacent temporary traffic lane indicates the direction of travel of the vehicle through the temporary traffic lane, and wherein predicting the direction of travel through the temporary traffic lane comprises predicting the direction of travel through the temporary traffic lane at least partly based on the direction of travel of the vehicle through the temporary traffic lane.

7. The system of claim 1, wherein the first indication of the direction of travel of the vehicle traveling through the temporary traffic lane or the adjacent temporary traffic lane indicates the direction of travel of the vehicle through the adjacent temporary traffic lane, and wherein predicting the direction of travel through the temporary traffic lane comprises:

determining a direction that is opposite to the direction of travel of the vehicle through the adjacent temporary traffic lane; and predicting the direction of travel through the temporary traffic lane at least partly based on the direction that is opposite to the direction of travel of the vehicle through the adjacent temporary traffic lane.

8. The system of claim 1, wherein the one or more processors are configured to:

determine at least one of a position and an angle of a first set of objects from the one or more objects on the road, wherein the first set of objects are located at an end of the at least one boundary of the temporary traffic lane;

determine that vehicles traveling from a pre-existing traffic lane should merge onto the temporary traffic lane based on at least one of the position and the angle of the first set of objects from the one or more objects on the road; and predict the direction of travel through the temporary traffic lane at least partly based the determination that vehicles traveling from the pre-existing traffic lane should merge onto the temporary traffic lane, wherein the direction of travel through the temporary traffic lane matches a particular direction of travel associated with the pre-existing traffic lane.

9. The system of claim 1, wherein the sensor data comprises at least one of data from a light detection and ranging sensor, data from a radio detection and ranging sensor, image data from a camera sensor, data from a time-of-flight sensor, data from an infrared sensor, and data from an acoustic sensor.

10. A method comprising:

detecting, based on sensor data from one or more sensors of a vehicle, a temporary traffic lane on a road configured for use by traffic to navigate the road in lieu of one or more preexisting traffic lanes on the road, wherein at least one boundary of the temporary traffic lane is defined by a plurality of objects placed on the road;

detecting, based on the sensor data, one or more cues indicating a direction of travel through the temporary traffic lane based on:

a first indication of a direction of travel of a vehicle traveling through the temporary traffic lane or an adjacent temporary traffic lane, a second indication of the direction of travel through the temporary traffic lane or a second direction of travel through the adjacent temporary traffic lane, provided by a human traffic controller in a scene associated with the road, and a third indication of the direction of travel through the temporary traffic lane or the second direction of travel through the adjacent temporary traffic lane, predicted based on one or more objects on the road, wherein:

the one or more cues comprise a first cue associated with the first indication, a second cue associated with the second indication, and a third cue associated with the third indication, the one or more objects comprise a sign placed in the scene to direct traffic through at least one of the temporary traffic lane and the adjacent temporary traffic lane, and detecting the one or more cues comprises detecting, based on image data in the sensor data, a visual cue in the sign;

assigning respective weights to the first cue associated with the first indication, the second cue associated with the second indication, and the third cue associated with the third indication, wherein each respective weight among the respective weights is indicative of a confidence level of a reliability of a direction of travel determined from the cue associated with the respective weight;

recognizing the visual cue as a visual indication of at least one of the direction of travel through the temporary traffic lane and the second direction of travel through the adjacent temporary traffic lane, wherein the direction of travel through the adjacent temporary traffic lane is different from the second direction of travel through the temporary traffic lane; and predicting, by a computer of the vehicle, the direction of travel through the temporary traffic lane or the second direction of travel through the adjacent temporary traffic lane based on:

combining direction of travel information respectively corresponding to the first cue associated with the first indication, the second cue associated with the second indication, and the third cue associated with the third indication; and the respective weights assigned to the first cue associated with the first indication, the second cue associated with the second indication, and the third cue associated with the third indication.

11. The method of claim 10, wherein recognizing the visual cue as the visual indication of at least one of the direction of travel through the temporary traffic lane and the second direction of travel through the adjacent temporary traffic lane comprises recognizing the visual cue as the visual indication of the second direction of travel through the adjacent temporary traffic lane, wherein the method further comprises:

determining a direction that is opposite to the second direction of travel through the adjacent temporary traffic lane; and predicting the second direction of travel through the temporary traffic lane based on the direction that is opposite to the second direction of travel through the adjacent temporary traffic lane.

12. The method of claim 10, wherein the second indication of directionality provided by the human traffic controller comprises at least one of a gesture of the human traffic controller and a verbal instruction of the human traffic controller.

13. The method of claim 12, wherein the gesture of the human traffic controller comprises pointing in a particular direction in association with at least one of the temporary traffic lane and the adjacent temporary traffic lane, and wherein the method further comprises:

recognizing, based on image data in the sensor data, the gesture as pointing in the particular direction in association with at least one of the temporary traffic lane and the adjacent temporary traffic lane; and predicting the direction of travel through the temporary traffic lane based on the gesture of the human traffic controller pointing in the particular direction in association with at least one of the temporary traffic lane and the adjacent temporary traffic lane.

14. The method of claim 12, wherein the second indication of directionality provided by the human traffic controller comprises the verbal instruction, and wherein the method further comprises:

based on recorded audio in the sensor data, recognizing, using a speech recognition algorithm, the verbal instruction of the human traffic controller; and predicting the direction of travel through the temporary traffic lane based on the verbal instruction of the human traffic controller.

15. The method of claim 10, wherein the first indication of the direction of travel of the vehicle traveling through the temporary traffic lane or the adjacent temporary traffic lane indicates the direction of travel of the vehicle through the temporary traffic lane, and wherein predicting the direction of travel through the temporary traffic lane comprises predicting the direction of travel through the temporary traffic lane at least partly based on the direction of travel of the vehicle through the temporary traffic lane.

16. The method of claim 10, further comprising:

determining at least one of a position and an angle of a first set of objects from the one or more objects on the road, wherein the first set of objects are located at an end of the at least one boundary of the temporary traffic lane;

determining that vehicles traveling from a pre-existing traffic lane should merge onto the temporary traffic lane based on at least one of the position and the angle of the first set of objects from the one or more objects on the road; and predicting the direction of travel through the temporary traffic lane at least partly based the determination that vehicles traveling from the pre-existing traffic lane should merge onto the temporary traffic lane, wherein the direction of travel through the temporary traffic lane matches a particular direction of travel associated with the pre-existing traffic lane.

17. The method of claim 10, wherein the sensor data comprises at least one of data from a light detection and ranging sensor, data from a radio detection and ranging sensor, image data from a camera sensor, data from a time-of-flight sensor, data from an infrared sensor, and data from an acoustic sensor.

18. A non-transitory computer-readable medium having stored thereon instructions which, when executed by one or more processors, cause the one or more processors to:

detect, based on sensor data from one or more sensors of a vehicle, a temporary traffic lane on a road configured for use by traffic to navigate the road in lieu of one or more preexisting traffic lanes on the road, wherein at least one boundary of the temporary traffic lane is defined by a plurality of objects placed on the road;

detect, based on the sensor data, one or more cues indicating a direction of travel through the temporary traffic lane based on:

a first indication of a direction of travel of a vehicle traveling through the temporary traffic lane or an adjacent temporary traffic lane, a second indication of the direction of travel through the temporary traffic lane or a second direction of travel through the adjacent temporary traffic lane, provided by a human traffic controller in a scene associated with the road, and a third indication of the direction of travel through the temporary traffic lane or the second direction of travel through the adjacent temporary traffic lane, predicted based on one or more objects on the road, wherein:

the one or more cues comprise a first cue associated with the first indication, a second cue associated with the second indication, and a third cue associated with the third indication, the one or more objects on the road comprise a sign placed in the scene to direct traffic through at least one of the temporary traffic lane and the adjacent temporary traffic lane, and in detecting the one or more cues, the one or more processors detect, based on image data in the sensor data, a visual cue in the sign;

assign respective weights to the first cue associated with the first indication, the second cue associated with the second indication, and the third cue associated with the third indication, wherein each respective weight among the respective weights is indicative of a confidence level of a reliability of a direction of travel determined from the cue associated with the respective weight;

recognize the visual cue as a visual indication of at least one of the direction of travel through the temporary traffic lane and the second direction of travel through the adjacent temporary traffic lane, wherein the direction of travel through the adjacent temporary traffic lane is different from the second direction of travel through the temporary traffic lane; and predict the direction of travel through the temporary traffic lane or the second direction of travel through the adjacent temporary traffic lane based on;

combining direction of travel information respectively corresponding to the first cue associated with the first indication, the second cue associated with the second indication, and the third cue associated with the third indication; and the respective weights assigned to the first cue associated with the first indication, the second cue associated with the second indication, and the third cue associated with the third indication.

* * * * *